United States Patent [19]
Hunt et al.

[11] Patent Number: 6,128,712
[45] Date of Patent: Oct. 3, 2000

[54] METHOD AND APPARATUS FOR IMPROVING PLAYBACK OF INTERACTIVE MULTIMEDIA WORKS

[75] Inventors: V. Bruce Hunt, Menlo Park; Ken Day, Aptos; Harry R. Chesley, San Francisco, all of Calif.

[73] Assignee: Macromedia, Inc., San Francisco, Calif.

[21] Appl. No.: 08/792,484

[22] Filed: Jan. 31, 1997

[51] Int. Cl.[7] .................................................. G06F 12/02
[52] U.S. Cl. ........................ 711/158; 711/137; 711/204; 710/40; 369/14; 369/15; 369/30; 369/34
[58] Field of Search .................................... 711/137, 151, 711/158, 4, 114, 117, 111, 159, 204; 710/6, 29, 40, 41; 369/14, 15, 30, 34

[56] References Cited

U.S. PATENT DOCUMENTS

| | | |
|---|---|---|
| 4,710,763 | 12/1987 | Franke et al. . |
| 5,183,756 | 2/1993 | Schlom .............................. 435/240.27 |
| 5,241,671 | 8/1993 | Reed et al. . |
| 5,262,964 | 11/1993 | Bonsall et al. ........................... 364/514 |
| 5,265,065 | 11/1993 | Turtle . |
| 5,390,318 | 2/1995 | Ramakrishnan et al. ............... 711/158 |
| 5,418,948 | 5/1995 | Turtle . |
| 5,442,771 | 8/1995 | Filepp et al. . |
| 5,444,617 | 8/1995 | Merialdo . |
| 5,446,891 | 8/1995 | Kaplan et al. . |
| 5,463,777 | 10/1995 | Bialkowski et al. . |
| 5,465,358 | 11/1995 | Blades et al. . |
| 5,485,609 | 1/1996 | Vitter et al. . |
| 5,487,166 | 1/1996 | Cossock . |
| 5,488,725 | 1/1996 | Turtle et al. . |
| 5,566,317 | 10/1996 | Treiber et al. ........................... 711/117 |
| 5,619,676 | 4/1997 | Fukuda et al. ........................... 711/137 |
| 5,623,490 | 4/1997 | Richter et al. ........................... 370/263 |
| 5,732,256 | 3/1998 | Smith ........................................ 707/1 |
| 5,732,267 | 3/1998 | Smith ..................................... 395/651 |
| 5,754,730 | 5/1998 | Windrem et al. ........................ 711/137 |

OTHER PUBLICATIONS

Dantzig and Bergin, 1990, Biochimica et Biophysica Acta 1027:211–217.

(List continued on next page.)

*Primary Examiner*—Hiep T Nguyen
*Attorney, Agent, or Firm*—The Hecker Law Group

[57] ABSTRACT

The present invention comprises a system for delivering an interactive multimedia work from a storage device, for example a hard disk drive, a CD-ROM drive, a network server, etc. to a playback device, for example a personal computer, in a manner that provides improved performance regardless of the playback sequence selected by a user. In one embodiment of the present invention, for each segment of an interactive multimedia work, a probability factor is assigned to each possible alternative succeeding segment. In addition a retrieval and delivery time cost factor is also assigned to each possible succeeding segment. In one embodiment of the invention, the time cost factor for each resource is assigned a fixed value. In another embodiment, the time cost factor is recalculated periodically to reflect changes in location and status of resources. The probability and time cost factor for each possible succeeding segment are combined to produce a relative priority ranking. Resources for the possible succeeding segments are preloaded according to the relative priority ranking. As a result, the latency time between the time a segment is selected as a result of user input and the time at which execution of the segment begins is reduced and the performance of a multimedia work improved. In one embodiment of the invention, in addition to delivering resources in the order of a relative priority ranking, the resources are also stored according to the relative priority ranking, thereby reducing the average seek time needed to find and retrieve resources and further improving playback performance.

105 Claims, 17 Drawing Sheets

OTHER PUBLICATIONS

Dantzig et al., 1992, Biochimica et Biophysica Acta 1112:167–173.
Kramer et al. 1990, Biochimica et Biophysica Acta 1030:41–49.
Kramer et al., 1990, Biochimica et Biophysica Acta 1030:50–59.
Ganapathy and Leibach, 1991, Current Opinion in Cell Biology 3:695–701.
Kramer et al., 1991, International Congress of Chemptherapy, Berlin, F.R.G. Abstract No. 1415.
Bird and Lloyd, 1990, Biochimica et Biophysica Acta 1024:267–270.
Skopicki, et al., 1991, Am. J. Physiol. 261:F670–F678.
Ganapathy, et al., 1981, J. Biol. Chem. 256:118–124.
Said, et al., 1988, Biochim. Biophys. Acta 941:232–240.
Kramer, et al., 1988, Biochim. Biophys. Acta 939:167–172.
Calonge, et al., 1990, Am. J. Physiol. 256:G775–G780.
Shimada and Hoshi, 1986, Jpn. J. Physiol. 36:451–465.
Matthews and Burston, 1984, Clinical Sci. 67:541–549.
Okano, et al., 1986, J. Biol. Chem. 261:14130–14134.
Nakashima, et al., 194, Biochem. Pharm. 33:3345–3352.
Muranushi, et al., 1989, Pharm. Res. 6:308–312.
Friedman and Amidon, 1989, Pharm. Res. 6:1043–1047.
Friedman and Amidon, 1990, J. Control. Rel. 13:141–146.
Tabas, et al., 1991, 31st Interscience Conference on Antimicrobial Agents and Chemotherapy Abstract No. 164.
Dantzig, et al., 1992, 32nd Interscience Conference on Antimicrobial Agents and Chemotherapy, Anaheim, CA, Abstract No. 1460.
Snyder, et al., 1992, 32nd Interscience Conference on Antimicrobial Agents and Chemotherapy Abstract No. 1461.
Hoshi, 1986, Ion Gradient–Coupled Transport, INSERM Symposium No. 26. Editors; F. Alvarado and C. van Os, Elsevier Science Publishers.
Ganapathy and Leibach, 1983, J. Biol. Chem. 258:14189–14192.
Inui, et al., 1992, J. Pharmacol. Exp. Thera. 260:482–486.
Sezaki and Kimura, 1983, Topics in Pharmaceutical Sciences 133–142.
Okano, et al., 1986, Biochem. Pharmacol. 35:1781–1786.
Bai, et al., 1991, Pharm. Res. 8:593–599.
Kramer, 1987, Biochim. Biophys. Acta 905:65–74.
Miyamoto, et al., 1991, J. Biological Chemistry 266(8):4742–4745.
Kramer, et al., 1988, Biochem. Pharmacol. 37:2427–2435.
Sugawara, M., et al., 1992, J. Pharm. Pharmacol. 44:968–972.

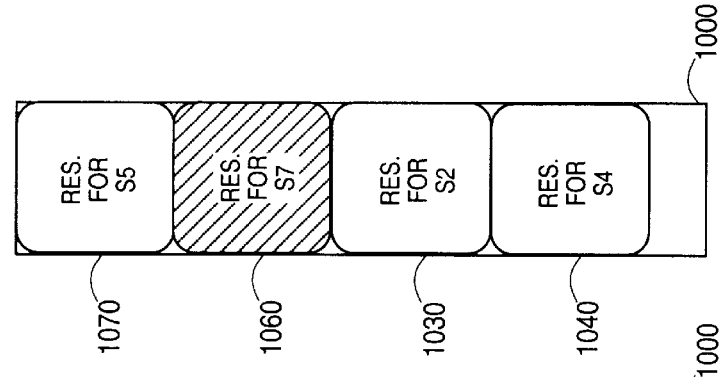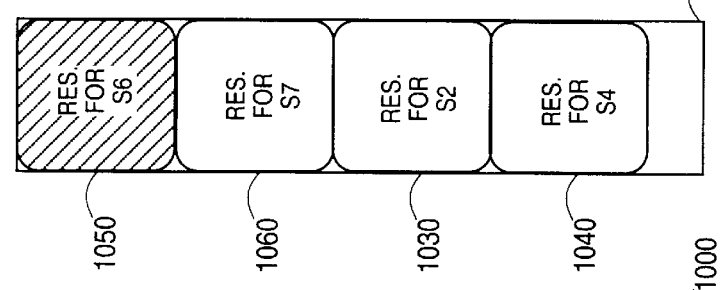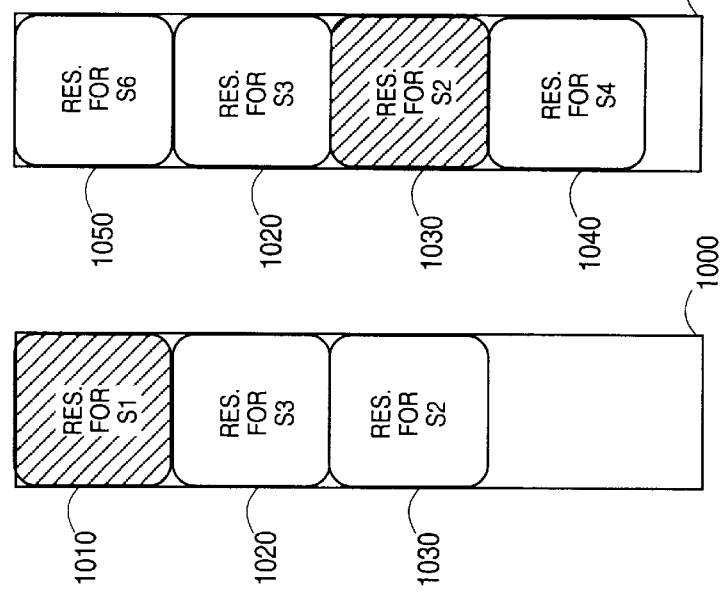

METHOD AND APPARATUS FOR IMPROVING PLAYBACK OF INTERACTIVE MULTIMEDIA WORKS

BACKGROUND OF THE INVENTION

1. Field of the invention

The present invention relates to the field of multimedia works, and more specifically to a method and apparatus for improving delivery and playback of interactive multimedia works.

2. Background Art

Multimedia works are works containing more than one "media" such as text, sound, video, still and animated graphics, etc. Multimedia works may be delivered to a viewer (user) in a variety of forms, including live presentations, television broadcasts, computer programs, and Internet web pages. The present invention involves multimedia works that are presented to a user by a delivery device such as a computer, a television, or a similar appliance.

"Interactive" multimedia works are multimedia works in which the sequence in which the work is presented is determined by user actions. Examples of interactive multimedia works include computer games, computer based information resource applications (for example a CD-ROM based travel guide or multimedia encyclopedia), websites on the Internet, computer learning programs (for example foreign language programs or college entrance examination study programs), annotated books (for example multimedia versions of classic literary, historical and religious works), interactive television programs, and other works that respond to user input.

The content of an interactive multimedia work can be thought of as a series of individual segments, each having a beginning point and an end point. The individual segments are linked together sequentially in an order determined by the user. Once started, a segment normally executes from its beginning to its end. At the end of a segment a succeeding segment is selected, according to user input, from among a generally finite number of alternatives. The identity and number of segments available at each segment end point are set by the author of the multimedia work.

Each segment includes one or more media elements. For example, a segment may include an introductory graphic animation sequence with an accompanying audio track, followed by a video clip, followed by a screen of text. To present (or "play") a segment, the playback device being used must have available the appropriate resources in the form of the data to be presented and an appropriate playback system for that form of data. For example, if the playback device is a computer, to play a video clip contained in a segment of a multimedia work, the computer must have available in its internal memory (for example RAM memory) the video data for the video clip as well as the appropriate application program needed to playback the video data. For example, a segment of a multimedia work may contain a video clip for which the video data is stored in MPEG file format on a CD-ROM disk. In order for the computer to display the video clip, the computer's processor must have access to an MPEG video player (software that allows the display of MPEG video data) as well as to the MPEG video data itself.

If a playback device used for presenting a multimedia work has unlimited internal memory, all data and application code needed to present a multimedia work can be loaded into the playback device's memory at one time. The playback device always has all resources available for every segment of the multimedia work. A transition from one segment to the next selected segment can therefore be made nearly instantaneously.

In general, however, a playback device has only a limited amount of internal memory available. Because the size of multimedia works are commonly much larger than a playback device's available internal memory, only a portion of the data and application code of a multimedia work can be stored in the playback device's internal memory at one time. The remainder of the data and application code needed to playback the multimedia work must be stored in external memory devices (stores) such a hard drive, a CD-ROM, or a network server. Often, a combination of such stores are used.

In order to proceed without delay from one segment to the succeeding segment, the resources required for the succeeding segment must be available to the playback device's processor, preferably in quickly accessible internal memory, at the end of the currently playing segment. If the resources required for the succeeding segment are not available at such time, execution of the succeeding segment is delayed while the resources are located and retrieved. If the resources are stored on a CD-ROM drive or a server accessed over a communications network, retrieval of the required resources can take a significant amount of time, causing an excessive and undesirable delay in the execution of the succeeding segment.

If the identity of the succeeding segment were known ahead of time, the resources required for the succeeding segment could be pre-loaded into the playback device's internal memory while the preceding segment is being executed, assuring that they are available when needed. However, for an interactive multimedia title, for each segment, there are a number of possible succeeding segments. The identity of the actual succeeding segment is not known until the end of the currently executing segment is reached, which is the same time at which the resources required for the succeeding segment are needed.

One possible solution is to pre-load resources for all possible succeeding segments while a segment is being executed. However, doing so is often not possible. First, the available internal memory of a playback device is often not sufficient to store the resources required for all possible succeeding segments. Second, even if the size of the available memory is sufficient, the time required to retrieve all required resources for all possible succeeding segments may exceed the execution time of the currently executing segment. Accordingly, it is often impractical to pre-load the resources for all possible succeeding segments.

If it were possible to guess correctly which of the possible succeeding segments will be selected for execution after a currently executing segment 100% of the time, then the resources only for that succeeding segment would have to be pre-loaded. However, it is in general not possible to predict with 100% certainty which succeeding segment will be selected by user input.

In the prior art, attempts have been made to improve the performance of interactive multimedia titles by attempting to identify, for each segment, the most likely succeeding segment of the possible succeeding segments. Such identification may, for example, be done by the author of an interactive multimedia work at the time the multimedia work is being created based on the author's best guess of what the most likely user selection will be. The resources for the segment identified as the most likely succeeding segment are then pre-loaded while the preceding segment is being executed.

If a user were to always select the segment that the author has designated as the segment to be pre-loaded, then a multimedia playback system utilizing the prior art method of pre-loading the designated most likely succeeding segment could provide an increase in performance over a system that provides no pre-loading. However, it is unlikely that a user will always choose the designated segment. In fact, if a user always did so, there would be no need for any alternative segments. In cases where the user selects a segment other than the pre-loaded segment, the prior art provides no benefit at all: at the end of the preceding segment, execution of the chosen succeeding segment is delayed while the resources needed for the segment are located and retrieved. The result is highly inconsistent performance: performance is good if a user selects the designated succeeding segment, performance is poor if the user selects any of the other available segments.

There remains a need for a multimedia playback system that provides improved performance regardless of which succeeding segment is selected by user action.

SUMMARY OF THE INVENTION

The present invention comprises a system for delivering an interactive multimedia work from a storage device, for example a hard disk drive, a CD-ROM or DVD disk drive, a network server, etc. to a playback device, for example a personal computer, in a manner that provides improved performance regardless of the playback sequence selected by a user.

In one embodiment of the present invention, for each segment of an interactive multimedia work, a probability factor is assigned to each possible alternative succeeding segment. The probability factor assigned to a possible succeeding segment represents an estimate of the probability that the segment will be selected for execution upon the completion of the currently executing segment. In one embodiment, the probability factors are assigned by the author of the multimedia work. In another embodiment, the probability factors are dynamically updated based on observations of actual use.

In one embodiment of the invention, in addition to assigning a probability factor to each possible succeeding segment for a preceding segment, a retrieval and delivery time cost factor is also assigned to each possible succeeding segment. The retrieval and delivery time cost factor represents an estimate of the time required to retrieve and deliver to the playback device all of the resources required to execute the segment. The size of a retrieval and delivery time cost factor for a segment depends on a variety of factors, for example the size and storage location of the resources required, the speed of the communications channel between the storage device and the playback device, the amount of traffic at the storage device and along the communications channel, and other factors that determine the time required for a resource to be located, retrieved, and delivered to the playback device. In this embodiment, the probability and time cost factor for each possible succeeding segment are combined to produce a relative priority ranking. Resources for the possible succeeding segments are pre-loaded according to the relative priority ranking. As a result, the latency time between the time a segment is selected as a result of user input and the time at which execution of the segment begins is reduced and the performance of a multimedia work improved.

In one embodiment of the invention, in addition to delivering resources in the order of a relative priority ranking, the resources are also stored according to the relative priority ranking, thereby reducing the average seek time needed to find and retrieve resources and further improving playback performance.

In one embodiment of the invention, for each segment of a multimedia work, a probability factor is determined for each other segment of the multimedia work. This probability factor represents an estimate of the probability that a particular one of the other segments will be executed, not necessarily immediately after the segment, but at some point after the segment. This embodiment accordingly looks ahead not only to the immediately succeeding segment, but to one or more subsequent segments as well. In one embodiment, a time cost factor is combined with the probability factor to produce a relative priority ranking, and resources are pre-loaded according to this priority ranking.

In one embodiment of the invention, the time cost factor for each resource is assigned a fixed value. In another embodiment, the time cost factor is recalculated periodically to reflect changes in location and status of resources.

BRIEF DESCRIPTION OF THE DRAWINGS

FIG. 9 is a schematic diagram illustrating the sequence of executing segments of a multimedia work using one embodiment of the present invention.

FIG. 10A is a schematic diagram illustrating the contents of a playback device's memory for one embodiment of the present invention.

FIG. 10B is a schematic diagram illustrating the contents of a playback device's memory for one embodiment of the present invention.

FIG. 10C is a schematic diagram illustrating the contents of a playback device's memory for one embodiment of the present invention.

FIG. 10D is a schematic diagram illustrating the contents of a playback device's memory for one embodiment of the present invention.

DETAILED DESCRIPTION OF THE INVENTION

A method and apparatus for delivery and playback of interactive multimedia works is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Execution, or playback, of interactive multimedia works occurs in segments or stages. As the end of each segment is reached, the next succeeding segment is selected from a generally finite number of alternative segments based on user input. The segment may be directly selected by a user, or user input (or lack of user input) may indirectly select a segment based upon some predetermined, or random, criteria. An interactive multimedia work can thus be viewed as a series of branch points at which execution of the work transitions from one segment to another, with the identity of the transitioned-to segment depending in some manner on user input. "User input" as used here includes actual input of a user, but also includes any other form of input including input or lack of input from sources internal and external to a multimedia playback device. For example, such external inputs may include external physical variables such as weather, pressure, sound, moisture, temperature, light, etc.

Figure 1:
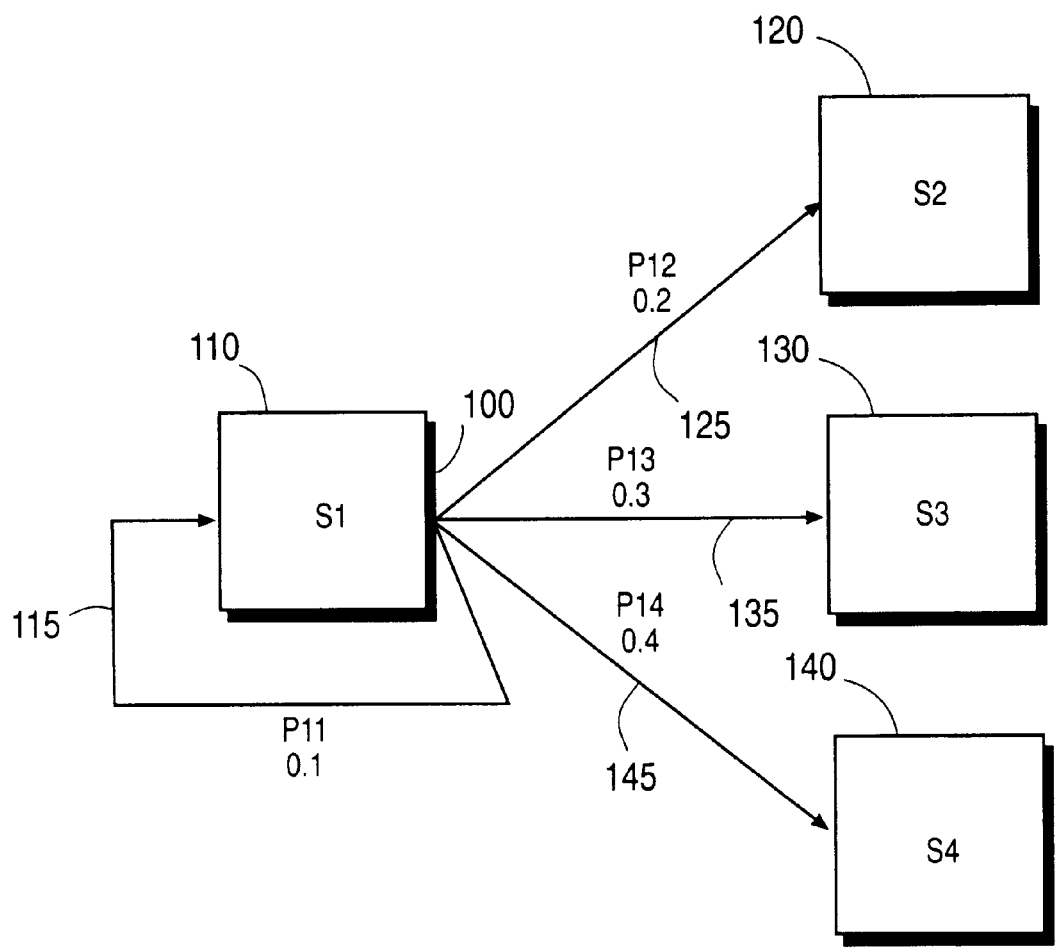
FIG. 1 is a block diagram illustrating an example of a branch point for an interactive multimedia work.

FIG. 1 is a block diagram illustrating an example of a branch point for an interactive multimedia work. At branch point 100 of FIG. 1, a transition occurs from segment S1 110 to a succeeding segment along one of four possible branches 115, 125, 135 or 145. The particular branch along which the transition occurs is dependent upon user or external input. Branch 115 represents a transition from the end of segment S1 back to the beginning of segment S1, resulting in a repeat execution of segment S1. Branch 125 represents a transition from the end of segment S1 to the beginning of segment S2. Branch 135 represents a transition from the end of segment S1 to the beginning of segment S3. Branch 145 represents a transition from the end of segment S1 to the beginning of segment S4.

In the example of FIG. 1, probability factors P11, P12, P13, and P14 have been assigned to each of branches 115, 125, 135, and 145, respectively. Probability factor P11 represents an estimate of the probability that segment S1 will be repeated. Probability factor P12 represents an estimate of the probability that execution of segment S2 will follow execution of segment S1. Probability factor P13 represents an estimate of the probability that execution of segment S3 will follow execution of segment S1. Probability factor P14 represents an estimate of the probability that execution of segment S4 will follow execution of segment S1. In the example of FIG. 1, P11 has a value of 0.1, P12 has a value of 0.2, P13 has a value of 0.3, and P14 has a value of 0.4. Assuming the values of the probability factors are accurate estimates of the actual probabilities, the most likely segment to follow execution of segment S1 is segment S4, which will occur 40% of the time. Segment S2 will follow segment S1 20% of the time, segment S3 will follow segment S1 30% of the time, and segment S1 will be repeated 10% of the time. P11, P12, P13 and P14 in this example add up to 1.0. In general, if the probability factors for each transition are accurate estimates of the actual probabilities, the sum of the probability factors will equal unity. However, if one or more of the probability factors differs from the corresponding actual probability, the sum of the probability factors at a transition point may differ from unity to some extent.

Figure 2:
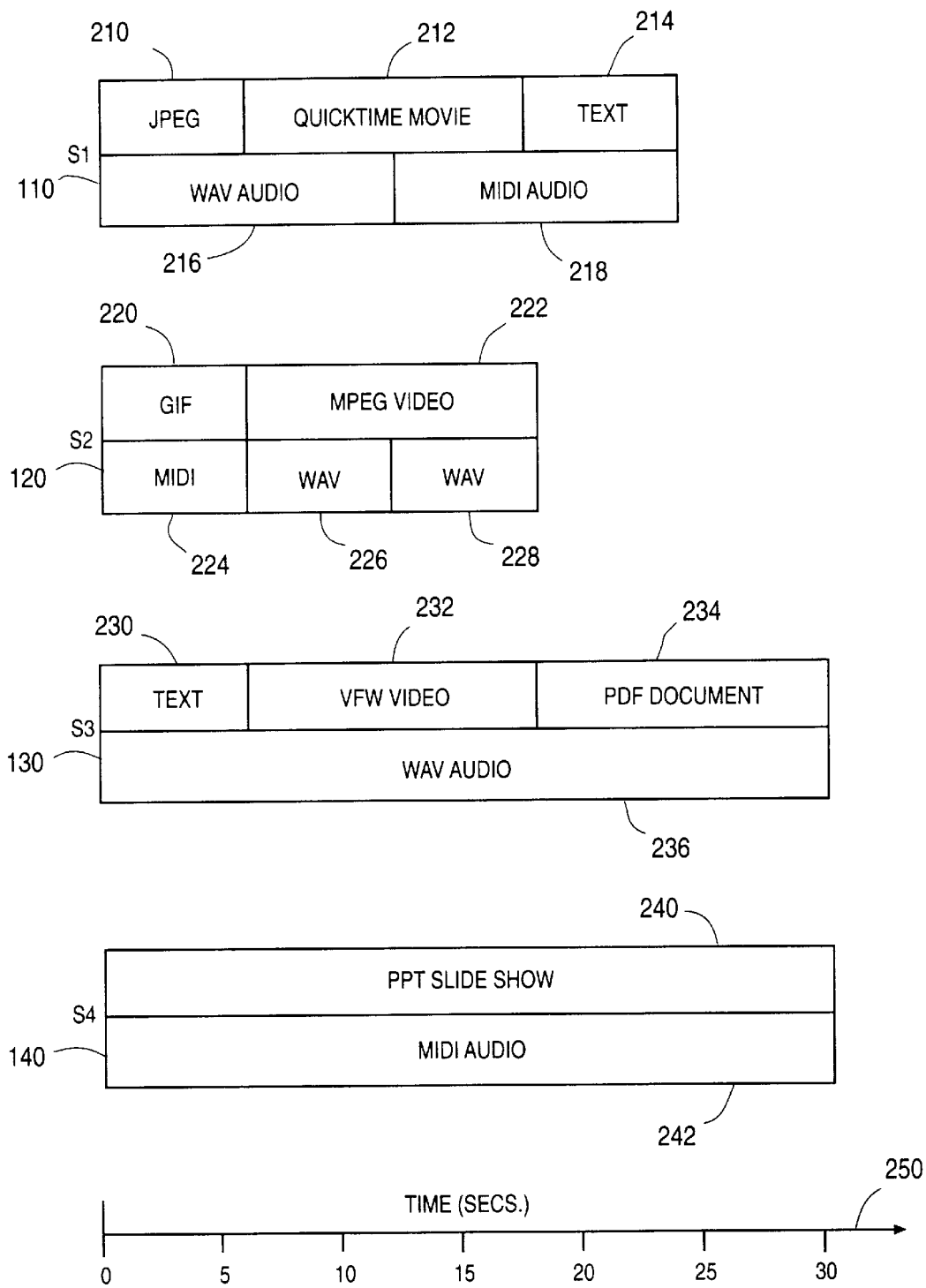
FIG. 2 is a schematic diagram illustrating the media content of each of segments S1–S4 of FIG. 1.

Each of segments S1–S4 of FIG. 1 require certain resources for execution. FIG. 2 is a schematic diagram illustrating the media components of each of segments S1–S4 of FIG. 1. In FIG. 2, the horizontal dimension represents a time of execution of a segment, as indicated by time scale 250.

As shown in FIG. 2, Segment S1 110 has an execution time of approximately 23 seconds, and includes five media components: JPEG graphic component 210, a QuickTime movie component 212, a text component 214, a WAV audio component 216, and a MIDI audio component 218. To be able to execute segment S1, the processor executing segment S1 must have available to it the data for each media component, as well as appropriate application program instructions for playing the form of data used. For example, to present JPEG graphic component 210 of segment S1, the processor of the playback device on which the multimedia work is being presented must have available the JPEG file containing the graphic data for graphic component 210 as well as JPEG viewer software that converts the JPEG file data into a displayable graphic. In a similar manner, for QuickTime movie component 212, the processor must have available the appropriate QuickTime movie file, as well as QuickTime movie player software. For text component 214, the resources required are the appropriate text file containing the appropriate text file data, and software for displaying the text file data. For MIDI audio component 218, the resources required are the appropriate file containing the MIDI audio data, and software for playing MIDI audio files. Table 1 lists the resources required for execution of segment S1, and the file size of each of these resources. Table 1 also lists the resources required for execution of segments S2, S3 and S4. The resources are numbered R10 to R43. The first digit indicates the segment for which the resource is used, while the second digit is a sequential index number, starting with the number 0, for resources for a particular segment. For example, resource R24 is resource 4 for segment S2.

TABLE 1

| Segment | Component | Resources | Size (MB) |
|---|---|---|---|
| S1 | JPEG Graphic 210 | R10 JPEG graphic file | 0.075 |
| | | R11 JPEG viewer | 0.350 |
| | QuickTime Movie 212 | R12 QuickTime video file | 2.870 |
| | | R13 QuickTime player | 0.976 |
| | Text 214 | R14 Text file | 0.015 |
| | | R15 Text file viewer | 0.225 |
| | WAV Audio 216 | R16 WAV audio file | 1.200 |
| | | R17 WAV player | 1.175 |
| | MIDI Audio 218 | R18 MIDI audio file | 0.100 |
| | | R19 MIDI player | 0.875 |
| | | Total S1 | 7.861 |
| | | Net S1-S1 | 0.000 |
| S2 | GIF Graphic 220 | R20 GIF graphics file | 0.150 |
| | | R21 GIF viewer | 0.650 |
| | MPEG Video 222 | R22 MPEG video file | 3.550 |
| | | R23 MPEG player | 1.100 |
| | MIDI Audio 224 | R24 MIDI audio file | 0.035 |
| | | R25 MIDI audio player | 0.875 |
| | WAV Audio 226 | R26 WAV audio file | 0.755 |
| | | R27 WAV player | 1.175 |
| | WAV Audio 228 | R28 WAV audio file | 0.880 |
| | | Total S2 | 9.170 |
| | | Net S2-S1 | 7.120 |
| S3 | Text 230 | R30 Text file | 0.011 |
| | | R31 Text file viewer | 0.225 |
| | VFW Video 232 | R32 VFW video file | 1.930 |
| | | R33 VFW player | 1.440 |
| | PDF Document 234 | R34 PDF document file | 0.544 |
| | | R35 PDF viewer | 1.235 |
| | WAV Audio 236 | R36 WAV audio file | 2.350 |
| | | R37 WAV player | 1.175 |
| | | Total S3 | 8.910 |
| | | Net S3-S1 | 7.510 |
| S4 | PPT Slide Show 240 | R40 PPT slide show file | 3.760 |
| | | R41 PPT slide show player | 1.275 |
| | MIDI Audio 242 | R42 MIDI audio file | 0.320 |
| | | R43 MIDI player | 0.875 |
| | | Total S4 | 6.230 |
| | | Net S4-S1 | 5.355 |

At the bottom of the entry for each segment, Table 1 lists the total size of the resources required for that segment, as well as the size of the net additional resources required, assuming all the resources for segment S1 are already available to the system processor. For example, as shown in Table 1, the size for the total resources for segment S3 is 8.910 megabytes. However, if segment S3 follows execution of segment S1, resources R31 and R37, namely a text file viewer and a WAV audio file player, need not be loaded into the processor's memory, because these resources have already been loaded as resources R15 and R17, respectively, of previous segment S1. Accordingly, the size of the net additional resources required for segment S3 is reduced by the size of resources R31 and R37 to 7.510 megabytes.

In one embodiment of the present invention, a retrieval and delivery time cost factor is determined for each segment. The retrieval and delivery time cost factor for a segment is an estimate of the relative time required to retrieve and deliver resources required for the segment. This relative time depends on a number of factors, including, for example, the size of the resources, the type of storage device in which each of the required resources is stored, the arrangement of the required data on the storage device, the seek and retrieval performance of the data storage device, the available bandwidth of the communications channel connecting the storage device to the playback device, etc. If all resources are stored on the same storage device, for a first approximation, the retrieval and delivery time cost factor for each resource can be taken to be proportional to the size of the resource. Since the time cost factors are relative, an arbitrary scale factor can be used. Table 2 lists example retrieval and delivery time cost factors for segments S1–S4 of FIG. 1, given the net size of the required resources listed in Table 1, and assuming that the time cost factors are to a first approximation dependent only on the sizes of the required resources. As shown in Table 2, the retrieval and delivery cost factors for segments S1, S2, S3, and S4 are thus 0.0, 7.1, 7.5, and 5.4, based on net required resources of sizes 0.0, 7.12 MB, 7.51 MB, and 5.355 MB, respectively.

TABLE 2

| Segment No. | Net. Size (MB) | Cost Factor | Prob. Factor | Priority Factor |
|---|---|---|---|---|
| S1 | 0.000 | 0.0 | 0.1 | 0.00 |
| S2 | 7.120 | 7.1 | 0.2 | 1.42 |
| S3 | 7.510 | 7.5 | 0.3 | 2.25 |
| S4 | 5.355 | 5.4 | 0.4 | 2.16 |

In addition to a retrieval and delivery cost factor, Table 2 also lists the probability factors for each segment from FIG. 1, as well as a priority factor. In the embodiment of FIG. 2, the priority factor for a segment is a product of the probability factor for that segment and the retrieval and delivery cost factor for that segment. Thus, for S1 the priority factor is 0.00 (0.0×0.1), and for S2, S3 and S4 the priority factors are 1.42 (7.1×0.2), 2.25 (7.5×0.3), and 2.16 (5.4×0.4), respectively.

In one embodiment of the present invention, resources for the alternative possible succeeding segments are pre-loaded to the extent memory is available in order of the priority factors for those segments. Therefore, for the values of the priority factors shown in Table 2, the resources for segment S3 (which has the highest priority factor) are pre-loaded first, followed, to the extent possible, by the resources for segments S4, S2 and S1, respectively.

The advantages of the present invention over the prior art system in which only the probability factor, and not the time cost factor, is considered when determining which segment to pre-load will be described with respect to the example playback device embodiment of FIG. 3. However, the description is applicable to other playback devices as well.

Figure 3:
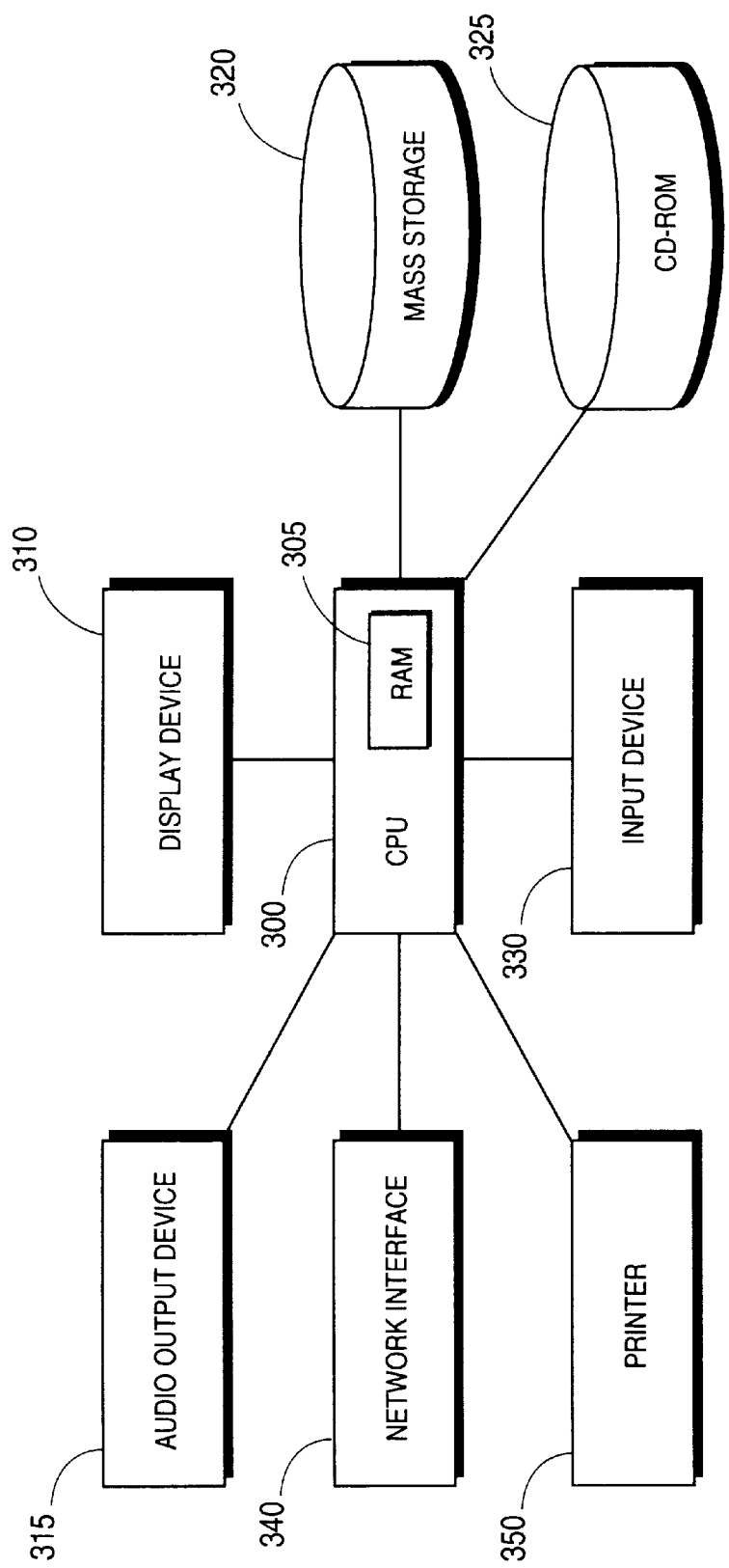
FIG. 3 is a schematic diagram of a computer system that can be used as a playback device in one embodiment of the present invention.

FIG. 3 is a schematic diagram of a computer system that may be used as a playback device for the present invention. The computer system shown in FIG. 3 includes a CPU unit 300 that includes a central processor, main RAM memory 305, peripheral interfaces, input-output devices, power supply, and associated circuitry and devices; a playback device 310 which may be a cathode ray tube display, LCD display, gas-plasma display, or any other computer display; an audio output device 315 such as amplified speakers or headphones, an input device 330, which may include a keyboard, mouse, digitizer, or other input device; non-volatile storage 320, which may include magnetic, re-writable optical, or other mass storage devices; a CD-ROM drive 325 and a printer 350. The computer system may also include a network interface 340, which may consist of a modem, allowing the computer system to communicate with other systems over a communications network such as the Internet. Any of a variety of other configurations of computer systems may also be used.

For the purposes of this example description, it will be assumed that CPU 300 of FIG. 3 has 24 megabytes of main memory 305, of which, after loading operating system software and device drivers, 18 megabytes remain available (in this example, there is assumed to be no virtual memory). However, the present invention is not limited to this particular configuration.

Figure 4:
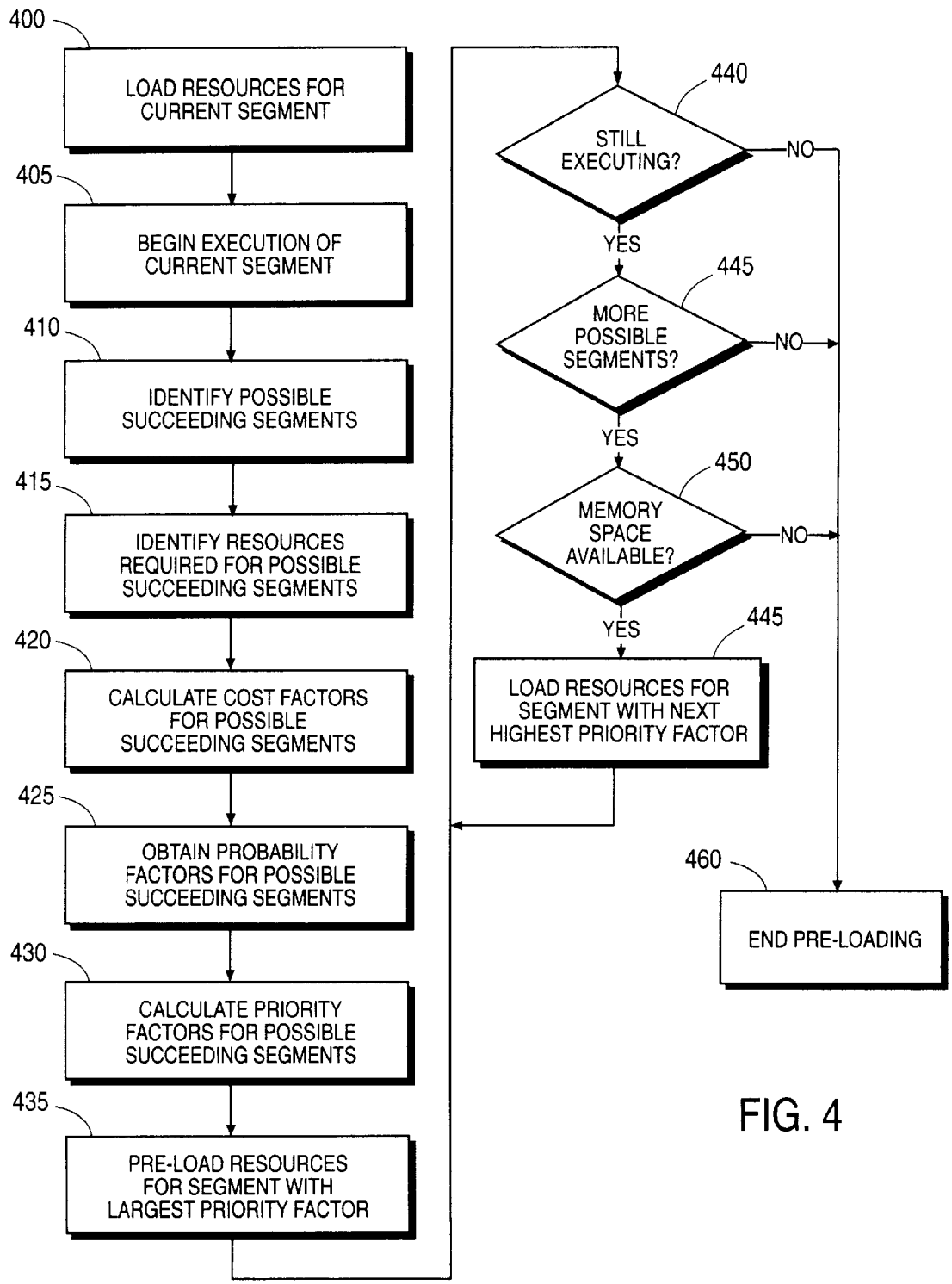
FIG. 4 is a block diagram illustrating a resource preloading operation for one embodiment of the present invention.

Operation of one embodiment of the present invention with respect to the portion of the multimedia work shown in FIG. 1 and having the characteristics listed in Tables 1 and 2 is shown in FIG. 4. As shown in FIG. 4, the operation begins by loading the resources required for the current segment (segment S1 in the present example) at block 400. These resources are resources R10–R19 listed in Table 1. According to Table 1, these resources have a total size of 7.861 MB. Given an initial 18 MB of available memory for this example, 10.139 MB remain available after loading resources R10–R19 of segment S1.

After the resources for the current segment (S1) have been loaded at block 400, execution of the current segment begins at block 405. While the current segment is executing, pre-loading of resources for the possible succeeding segments is initiated. At block 410, the possible succeeding segments are identified. Such identification may involve, for example, referring to a lookup table that lists the possible succeeding segments for each segment. At block 415, the resources required for each of the possible succeeding segments are identified. Such identification may involve, for example, referring to a lookup table that lists the resources required for each segment. After the resources required for each segment are identified, a cost factor for each resource is determined and a total cost factor for each segment is calculated at block 420. For the current example, the total cost factor for each segment is listed in the third column of Table 2.

At block 425 the probability factors for each of the possible succeeding segments are obtained. These factors may be obtained, for example, from a lookup table created by the author of the multimedia work. For the present example, these probability factors are listed in the fourth column of Table 2. The cost factors calculated at block 420 and the probability factors obtained at block 425 are used to calculate a priority factor for each segment at block 430. In one embodiment of the invention, the priority factor for a segment is calculated by taking the product of the cost factor and the probability factor for the segment. The resultant priority factors for the present example are listed in the fifth column of Table 2.

The priority factors calculated at block 430 may be viewed as estimates of the time costs to retrieve and load the resources required for each segment, normalized by an estimated probability that the segment will be selected.

The present invention improves playback of a multimedia title by pre-loading resources for potential succeeding segments in order of their priority factors. Accordingly, the resources for the segment with the highest priority factor are pre-loaded into memory at block 435. As shown in Table 2, in the present example, segment S3 has the highest priority factor of the possible alternative succeeding segments S1–S4. Accordingly, in this example, the additional resources required for segment S3 (taking into account the resources already loaded into memory for the currently executing segment, S1) are pre-loaded at block 435. These resources are resources R30 and R32–R36 listed in Table 1 (resources R31 and R37 need not be loaded because they have already been loaded as resources R15 and R17, respectively, of segment S1). As specified in Table 1, these resources have a size of 7.510 MB.

At block 440, a determination is made as to whether the currently executing segment (S1) is still executing. If the current segment has finished executing, the current pre-loading operation ends at block 460. If the current segment is still executing, time is available to load resources for additional segments, provided additional memory space is available. At block 445, a determination is made as to whether there are any more alternative segments for which resources need to be loaded. If there are no such segments, the pre-loading operation ends at block 460.

If there are additional segments for which resources need to be loaded, a determination is made as to whether memory space for additional resources is available at block 450. If no memory space is available, the pre-loading operation ends at block 460.

If additional memory space is available, resources for the segment with the next highest priority factor are retrieved and loaded into memory to the extent possible at block 455. In the current example, prior to loading the resources for segment S3 (the segment with the highest priority factor), 10.139 MB are available. After loading segment S3, 2.629 MB remain available. The segment with the next highest priority after segment S3, according to Table 2, is segment S4. The net resources required for segment S4, as specified in Table 2, require 5.355 MB of memory. The remaining available memory is only 2.629 MB. Accordingly, 2.629 MB of the total 5.355 megabytes of memory required for segment S4 are loaded into memory at block 455.

After block 455, the pre-loading operation returns to block 440. In the present example, since no more memory space is available, the pre-loading operation proceeds to block 460, where it ends.

Figure 5A:
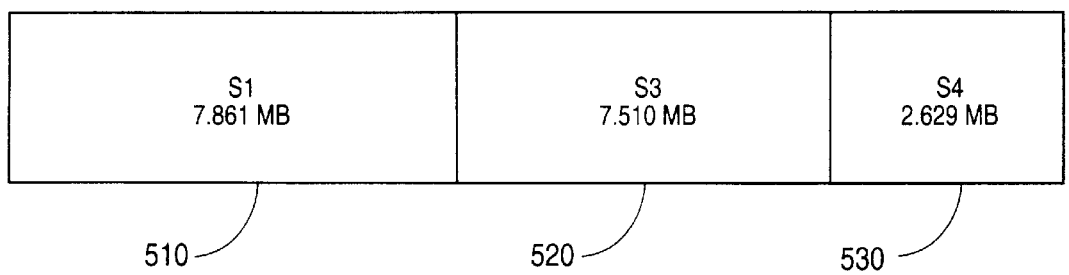
FIG. 5A is a schematic diagram of the configuration of a playback device's internal memory for one embodiment of the present invention.

FIG. 5A is a schematic diagram of a configuration of a playback device's internal memory 500 upon completion of execution of segment S1 in the present example using the pre-loading method of FIG. 4. As shown in FIG. 5A, in addition to the resources 510 required by segment S1, all of the resources 520 required for segment S3, and approximately half (2.629 MB of a total of 5.355 MB) of the resources required by segment S4 530 have been pre-loaded into the playback device's internal memory 500.

Figure 5B:
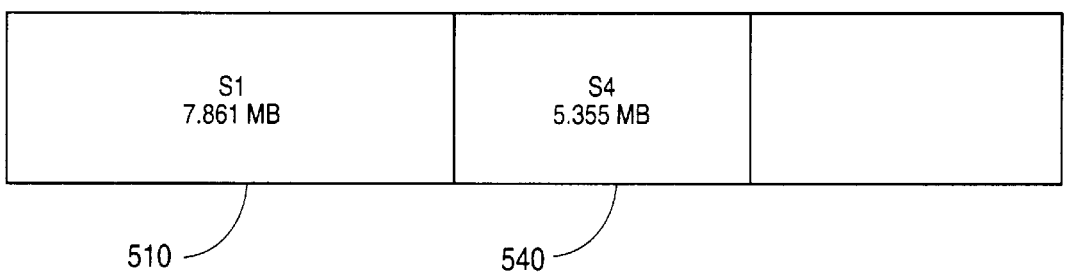
FIG. 5B is a schematic diagram of the configuration of a playback device's internal memory of the prior art.

FIG. 5B is a schematic diagram of a playback device's internal memory 500 after pre-loading using the pre-loading method of the prior art in which only the resources for the segment having the highest probability factor are pre-loaded into memory. As shown in FIG. 5B, using this prior art pre-loading method, internal memory 500 contains only the resources 540 for the segment with the highest probability factor, namely segment S4, in addition to the resources 510 for currently executing segment S1.

The performance of the embodiment of the present invention of FIG. 5A can be compared to the performance of the prior art system of FIG. 5B by comparing the average latency period between the end of execution of segment S1 of FIG. 1 and the beginning of execution of the succeeding segment, assuming that execution of the succeeding segment does not start until all resources required for execution of the succeeding segment have been loaded into memory and assuming the succeeding segment is chosen according to the probability factors specified in FIG. 1.

Tables 3 and 4 list the average latency periods for the embodiment of the present invention of FIG. 5A and the prior art system of FIG. 5B, respectively. In Tables 3 and 4, the latency periods for each segment have been calculated by determining the additional resources (in addition to resources already loaded into memory) required at the end of execution of segment S1 and dividing the sizes of these additional resources by an assumed loading and retrieval rate of 2 MB per second. The average latency periods have been calculated taking the sum of the products of the probability factor and the latency period for each of the four segments. As shown in Table 3, the average latency period for the embodiment of the present invention of FIG. 5A given this retrieval rate is 1.26 sec. As shown in Table 4, the average latency period for the prior art system of FIG. 5B is 1.84 sec. In this example, the embodiment of the present invention of FIG. 5A thus results in a reduction of the average latency period compared with the prior art embodiment of FIG. 5B of approximately 30%.

TABLE 3

| Segment | Prob. Factor | Add'l Res. Req. (MB) | Latency (sec.) | (Prob) × (Latency) |
|---|---|---|---|---|
| S1 | 0.1 | 0.00 | 0.00 | 0.00 |
| S2 | 0.2 | 7.12 | 3.56 | 0.71 |
| S3 | 0.3 | 0.00 | 0.00 | 0.00 |
| S4 | 0.4 | 2.73 | 1.37 | 0.55 |
| Average | | | 1.26 | |

TABLE 4

| Segment | Prob. Factor | Add'l Res. Req. (MB) | Latency (sec.) | (Prob) × (Latency) |
|---|---|---|---|---|
| S1 | 0.1 | 0.00 | 0.00 | 0.00 |
| S2 | 0.2 | 7.12 | 3.56 | 0.71 |
| S3 | 0.3 | 7.51 | 3.76 | 1.13 |
| S4 | 0.4 | 0.00 | 0.00 | 0.00 |
| Average | | | 1.84 | |

FIG. 1 illustrates a single branch point of a interactive multimedia work. An interactive multimedia work as a whole may contain many branch points. One embodiment of the present invention improves the execution of an interactive multimedia work by determining priority factors for segments by looking not just at the transitions possible at the most immediate branch point but by also taking into account transitions that may occur at subsequent branch points.

Figure 6:
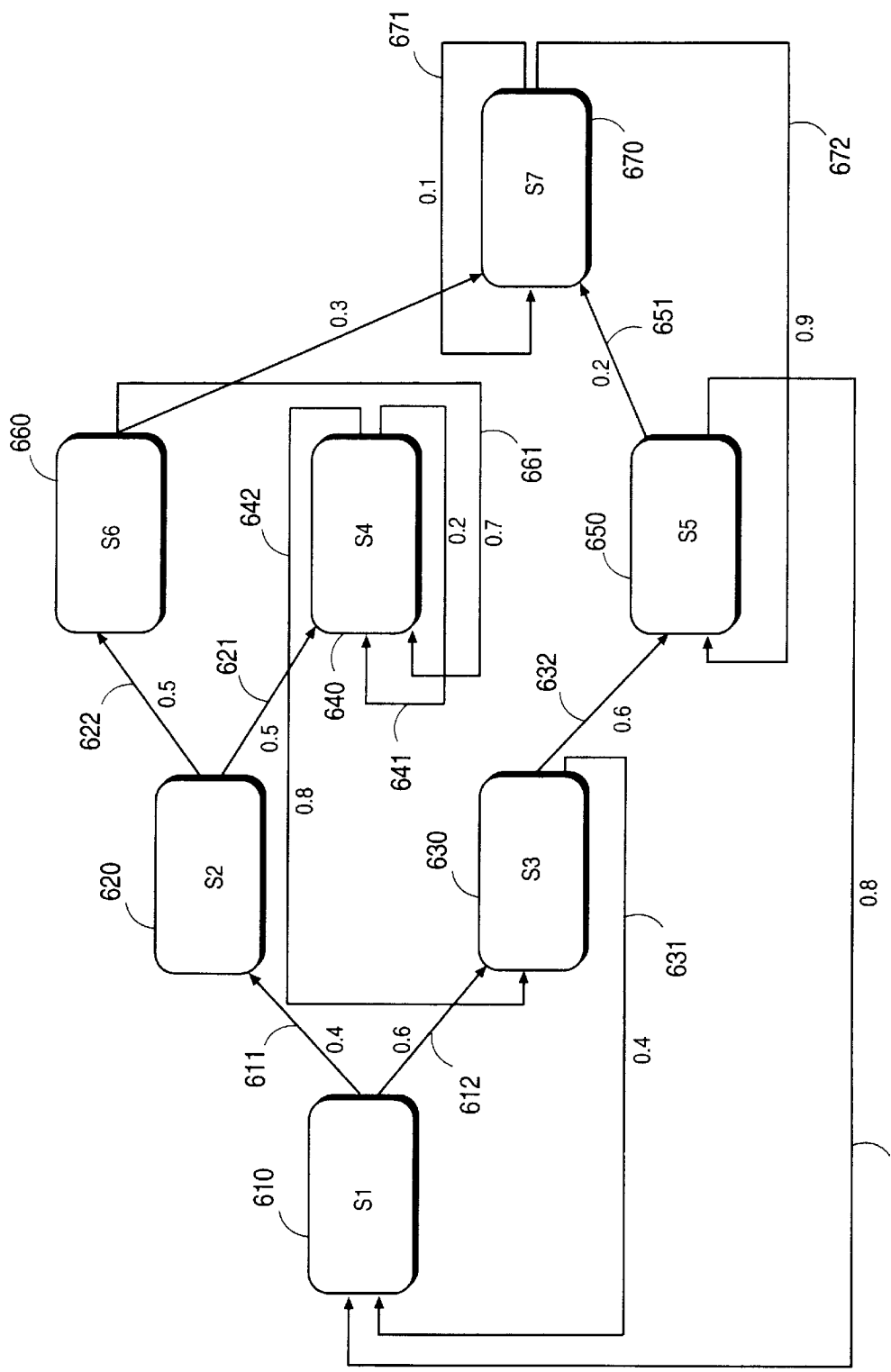
FIG. 6 is a block diagram illustrating an interactive multimedia work.

FIG. 6 is a block diagram illustrating branch points of an interactive multimedia work. The multimedia work of FIG. 6 includes seven segments S1 to S7 labeled items 610, 620, 630, 640, 650, 660 and 670, respectively. Arrows represent branches indicating possible transitions to and from each segment. Arrows pointing to a segment indicate a transition to that segment. Arrows pointing out of a segment indicate a transition from that segment. For example, segment S4 in FIG. 6 has three incoming arrows 621, 641, and 661, respectively, and two outgoing arrows 641 and 642, respectively. Arrow 621 indicates a transition from segment S2 to segment S4. Arrow 641 indicates a transition from segment S4 back to segment S4. Arrow 661 indicates a transition from segment S6 to segment S4. Arrow 642 indicates a transition from segment S4 to segment S3.

Numbers along each arrow indicate the probability factor assigned to each branch. For example, as shown in FIG. 6, branch 642 has been assigned a probability factor of 0.8 (representing an 80% chance that execution of segment S3 will directly follow execution of segment S4). Branch 641 has been assigned a probability factor of 0.2 (representing a 20% chance that a transition will occur from the end of segment S4 back to the beginning of segment S4). For the embodiment of FIG. 6, the probability factor for transitioning from a particular first segment to a particular second segment is taken to be constant regardless of the path taken to arrive at the first segment. For example, the probability factor for transitioning from segment S4 to segment S3 is 0.8 regardless of whether segment S2, S4 or segment S6 precedes segment S4.

The arrows in FIG. 6 represent direct transitions from a first segment to a second segment, and the probability factors shown next to each arrow represent estimates of the probability that the second segment will directly follow the first segment. In the embodiment of the invention described with respect to FIGS. 1–5, the sequence in which resources for segments were pre-loaded was based on the product of these direct transition probabilities and appropriate cost factors. For example, as shown in FIG. 6, the only two segments that can directly follow segment S1 are segment S2 and segment S3, with probability factors 0.4 and 0.6, respectively. The probability factors for transitions from segment S1 directly to any of the other segments, namely segment S1 itself and segments S4, S5, S6 and S7, are therefore all zero.

Using the convention that P11 represents the probability that segment S1 will follow segment S1, P12 represents the probability that segment S2 will follow segment S1, etc., a table of generalized probability factors can be assembled in matrix form as shown in Table 5.

TABLE 5

| | S1 | S2 | S3 | S4 | S5 | S6 | S7 |
|---|---|---|---|---|---|---|---|
| S1 | P11 | P12 | P13 | P14 | P15 | P16 | P17 |
| S2 | P21 | P22 | P23 | P24 | P25 | P26 | P27 |
| S3 | P31 | P32 | P33 | P34 | P35 | P36 | P37 |
| S4 | P41 | P42 | P43 | P44 | P45 | P46 | P47 |
| S5 | P51 | P52 | P53 | P54 | P55 | P56 | P57 |
| S6 | P61 | P62 | P63 | P64 | P65 | P66 | P67 |
| S7 | P71 | P72 | P73 | P74 | P75 | P76 | P77 |

Generalized Probability Factors

Table 6 summarizes the probability factors for direct transitions from each segment to each other segment for the example interactive multimedia work of FIG. 6 using the matrix form of Table 5.

TABLE 6

| | S1 | S2 | S3 | S4 | S5 | S6 | S7 |
|---|---|---|---|---|---|---|---|
| S1 | 0 | 0.4 | 0.6 | 0 | 0 | 0 | 0 |
| S2 | 0 | 0 | 0 | 0.5 | 0 | 0.5 | 0 |
| S3 | 0.4 | 0 | 0 | 0 | 0.6 | 0 | 0 |
| S4 | 0 | 0 | 0.8 | 0.2 | 0 | 0 | 0 |
| S5 | 0.8 | 0 | 0 | 0 | 0 | 0 | 0.2 |
| S6 | 0 | 0 | 0 | 0.7 | 0 | 0 | 0.3 |
| S7 | 0 | 0 | 0 | 0 | 0.9 | 0 | 0.1 |

Example Probability Factors

The matrix of probability factors of Table 5 can be used together with a matrix of time cost factors to produce a matrix of priority factors used to determine the order of loading of resources. A generalized time cost factor matrix may be assembled in a form similar to that of the probability factor table of Table 5, as shown in Table 7:

TABLE 7

|    | S1  | S2  | S3  | S4  | S5  | S6  | S7  |
|----|-----|-----|-----|-----|-----|-----|-----|
| S1 | T11 | T12 | T13 | T14 | T15 | T16 | T17 |
| S2 | T21 | T22 | T23 | T24 | T25 | T26 | T27 |
| S3 | T31 | T32 | T33 | T34 | T35 | T36 | T37 |
| S4 | T41 | T42 | T43 | T44 | T45 | T46 | T47 |
| S5 | T51 | T52 | T53 | T54 | T55 | T56 | T57 |
| S6 | T61 | T62 | T63 | T64 | T65 | T66 | T67 |
| S7 | T71 | T72 | T73 | T74 | T75 | T76 | T77 |

Generalized Time Cost Factors

In Table 7, time cost factor T53 for example, represents a time cost assigned to the process of locating and retrieving resources for segment S3 assuming that the resources for segment S5 have been loaded and are available. Similarly, time cost factor T41 represents a time cost for loading the extra resources required for segment S1 assuming the resources for segment S4 have been loaded and are available.

In one embodiment of the invention, for simplification, a single time cost factor is used for the resources required for a segment, regardless of the actual size of the resources and regardless of what resources have already been loaded for preceding segments. In this embodiment, all the entries of a time cost factor table such as Table 7 have the same value. Table 8 illustrates an embodiment of a time cost factor matrix in which the time cost factor used for each segment is equal to 1.

TABLE 8

|    | S1 | S2 | S3 | S4 | S5 | S6 | S7 |
|----|----|----|----|----|----|----|----|
| S1 | 1  | 1  | 1  | 1  | 1  | 1  | 1  |
| S2 | 1  | 1  | 1  | 1  | 1  | 1  | 1  |
| S3 | 1  | 1  | 1  | 1  | 1  | 1  | 1  |
| S4 | 1  | 1  | 1  | 1  | 1  | 1  | 1  |
| S5 | 1  | 1  | 1  | 1  | 1  | 1  | 1  |
| S6 | 1  | 1  | 1  | 1  | 1  | 1  | 1  |
| S7 | 1  | 1  | 1  | 1  | 1  | 1  | 1  |

Segment Independent Time Cost Factors

In other embodiments of the invention, time cost factors may be based on various parameters. In one embodiment, the storage device on which the resources for a multimedia work are stored is viewed as a server, and the playback device a client. The server may range from a computer with large storage resources available across a network to simple storage devices such as CD-ROM, DVD, or other disk drives directly attached to the playback device. In this embodiment, the server storage device provides data in response to requests from the client playback device. Parameters that may be considered in deriving time cost factors in this embodiment include the request processing time for the server to validate, authorize and analyze a request and determine the responses that are required, the seek time to locate a resource on the storage device, the read time required to read the resource data from the storage device, the response processing time for the server to formulate a response once the appropriate data has been read (including any post processing required on the data, formatting the data and partitioning it into a form necessary for transmission back to the client playback device), and the transmission time required to transmit the resource data from the server storage device to the client playback device. Accordingly, components of the time cost factor may include a request processing time cost, a seek time cost, a read time cost, a response processing time cost, and a transmission time cost. Each of these time costs in turn depend on other parameters, for example the performance characteristics of particular hardware being used, the arrangement of data on the storage device, the bandwidth of the communications channel, the size of the resource being retrieved. These time costs may be derived specifically for each configuration of storage device and playback device, or, for simplification, average or assumed values may be used.

A priority factor matrix may be assembled from the probability factors in Table 5 and the time cost factors in Table 7 by multiplying each probability factor in Table 5 by the corresponding time cost factor in Table 7 as shown in Table 9 (i.e. taking the dot product of the probability factor matrix and the time cost factor matrix):

TABLE 9

Generalized Priority Factors

|    | S1 | S2 | S3 | S4 | S5 | S6 | S7 |
|----|----|----|----|----|----|----|----|
| S1 | P11 × T11 | P12 × T12 | P13 × T13 | P14 × T14 | P15 × T15 | P16 × T16 | P17 × T17 |
| S2 | P21 × T21 | P22 × T22 | P23 × T23 | P24 × T24 | P25 × T25 | P26 × T26 | P27 × T27 |
| S3 | P31 × T31 | P32 × T32 | P33 × T33 | P34 × T34 | P35 × T35 | P36 × T36 | P37 × T37 |
| S4 | P41 × T41 | P42 × T42 | P43 × T43 | P44 × T44 | P45 × T45 | P46 × T46 | P47 × T47 |
| S5 | P51 × T51 | P52 × T52 | P53 × T53 | P54 × T54 | P55 × T55 | P56 × T56 | P57 × T57 |
| S6 | P61 × T61 | P62 × T62 | P63 × T63 | P64 × T64 | P65 × T65 | P66 × T66 | P67 × T67 |
| S7 | P71 × T71 | P72 × T72 | P73 × T73 | P74 × T74 | P75 × T75 | P76 × T76 | P77 × T77 |

Using the values of probability factors in Table 6 and the time cost factors in 8 results in the specific example priority factors shown in Table 10.

TABLE 10

|    | S1  | S2  | S3  | S4  | S5  | S6  | S7  |
|----|-----|-----|-----|-----|-----|-----|-----|
| S1 | 0   | 0.4 | 0.6 | 0   | 0   | 0   | 0   |
| S2 | 0   | 0   | 0   | 0.5 | 0   | 0.5 | 0   |
| S3 | 0.4 | 0   | 0   | 0   | 0.6 | 0   | 0   |
| S4 | 0   | 0   | 0.8 | 0.2 | 0   | 0   | 0   |
| S5 | 0.8 | 0   | 0   | 0   | 0   | 0   | 0.2 |
| S6 | 0   | 0   | 0   | 0.7 | 0   | 0   | 0.3 |
| S7 | 0   | 0   | 0   | 0   | 0.9 | 0   | 0.1 |

Specific Example Priority Factors

In the example shown in Table 10, because the value of all time cost factors is taken to be 1, the priority factor matrix is equivalent to the probability factor matrix.

The priority factors in the priority factor matrix are used in this embodiment of the invention to determine the order for pre-loading resources for other segments while a particular segment is being executed. Each row of the priority factor matrix lists the priority factors for a particular segment. For example, the third row of Table 10 lists the priority factors for segment S3. Letting PR31 represent the priority factor for loading resources for segment S1 while segment S3 is executing, PR32 the priority factor for loading resources for segment S2 while segment S3 is executing, etc., then it can be seen that the highest values for the priority factors for segment S3 are PR35 and PR31, which have values of 0.6 and 0.4, respectively. The remaining priority factors for segment S3, namely PR32, PR33, PR34, PR36 and PR37, all have a zero value. Accordingly, while segment S3 is executing, according to the priority factors listed in Table 10, segment S5 has the highest priority (0.6), followed by segment S1 (0.4). Accordingly, the resources for segment S5 are pre-loaded first, followed by the resources for segment S1. Because the priority factors for all other segments are zero, the resources for these segments are not pre-loaded while segment S3 is executing in this embodiment.

Table 11 specifies, for each segment of the multimedia work of FIG. 6, the pre-loading order for resources for subsequent segments of the multimedia work based on the values of the priority factors given in Table 10 in one embodiment of the present invention. Each column of Table 11 consists of a loading priority list for a particular segment. For example the first column is a loading priority list for segment S1.

TABLE 11

| Currently Executing Segment | | | | | | |
|---|---|---|---|---|---|---|
| S1 | S2 | S3 | S4 | S5 | S6 | S7 |
| S3 | S4 | S5 | S3 | S1 | S4 | S5 |
| S2 | S6 | S1 | S4 | S7 | S7 | S7 |

Loading Priority

Figure 8A:
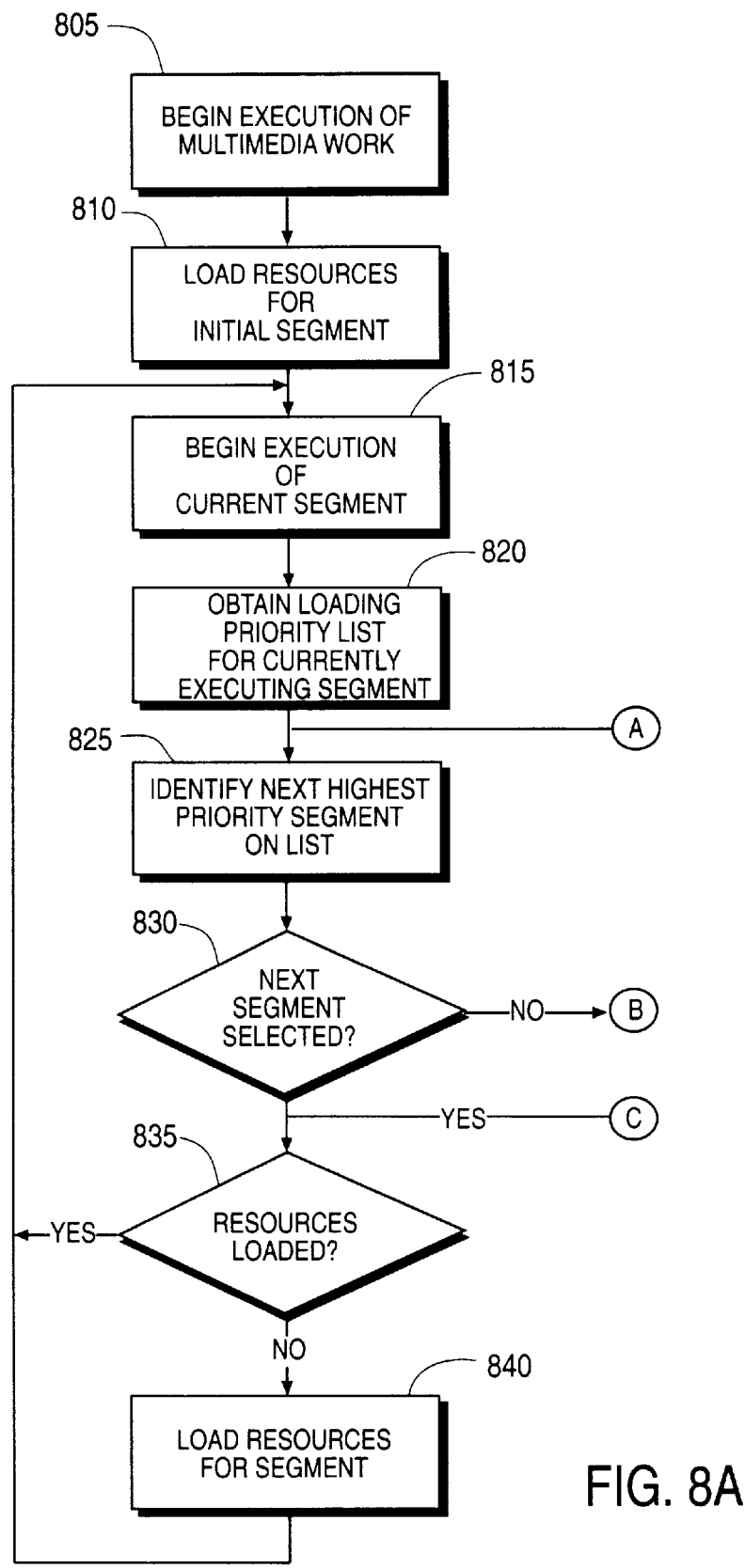
FIGS. 8 and 8A are block diagrams showing how the pre-loading order specified in Table 11 is used during execution of the multimedia work of FIG. 6 in one embodiment of the present invention.
Figure 8B:
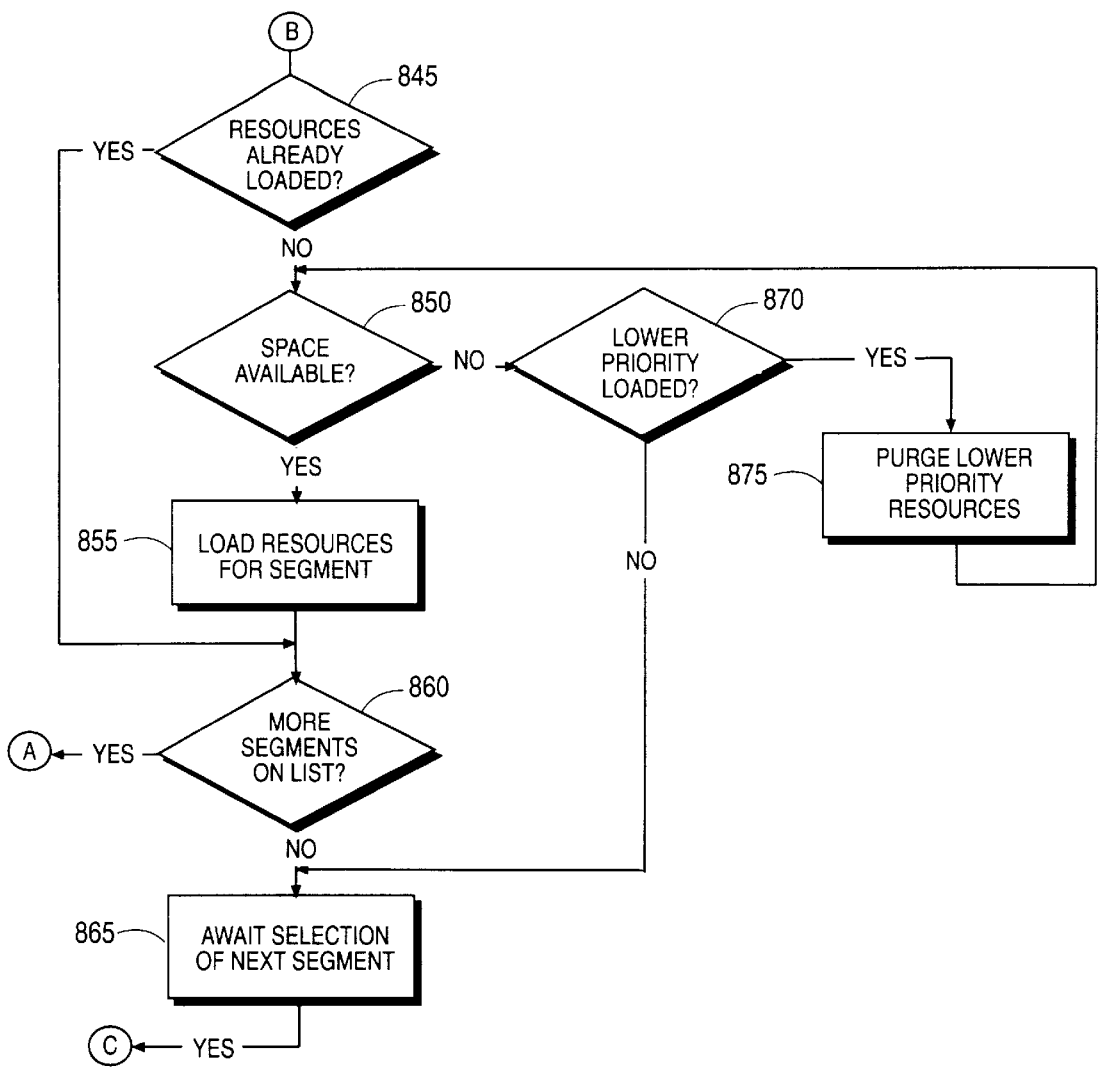

FIGS. 8A and 8B are block diagrams showing how the pre-loading order specified in Table 11 is used during execution of the multimedia work of FIG. 6 in one embodiment of the present invention. As shown in FIGS. 8A and 8B, execution of a multimedia work, for example the work of FIG. 6, is begun at block 805. The resources for the initial segment are loaded at block 810. The initial segment of a work may be an opening segment for the work that executes first whenever the work is executed, or the initial segment may be a segment that is selected by user input.

After the resources for the initial segment have been loaded, execution of the current segment, in this case the initial segment, is begun at block 815. While the current segment is executing, pre-loading of resources required for subsequent segments is begun by obtaining the loading priority list for the currently executing segment at block 820. For example, if the initial segment is segment S1 of the multimedia work of FIG. 6, the loading priority list consists of the first column of Table 11. As shown in Table 11, the loading priority list for segment S1 specifies that the resources for segment S3 should be loaded first, followed by the resources for segment S2.

After obtaining the loading priority list for the currently executing segment at block 820, the next highest priority segment on the list is identified. In the current example, this is the first time the loading priority list has been consulted during the current execution of the multimedia work. Accordingly, the "next highest" segment on the list is the first segment on the list. In the current example, segment S3 is the first segment on the list. At this point, a check is made to determine whether the current segment has completed execution and the next segment to be executed has been selected at block 830. If it is determined at block 830 that the next segment to be executed has not yet been selected, then a determination is made at block 845 as to whether the resources for the next highest priority segment identified at block 825 have already been loaded and are still resident in the playback device's memory. That may occur, for example, if the resources for the segment were loaded during execution of a previous segment and the available memory of the playback device is large enough so that the resources have not been purged from memory to make room for other, higher priority resources.

If it is determined at block 845 that the resources for the next highest priority segment have not yet been loaded, a determination is made at block 850 as to whether any memory space is available for loading these resources. If it is determined that space is not available, a determination is made at block 870 as to whether resources for any lower priority segment (not including the currently executing segment) that may have been previously loaded are still resident in memory. If it is determined that resources for one or more lower priority segments are loaded in memory, the resources for the lowest priority segment are purged at block 875 to free up the memory space occupied by those resources. Thereafter, execution continues to block 850.

If it determined at block 870 that no resources for any lower priority segments are still loaded in memory, then no additional memory space can be made available by purging other resources. The pre-loading process for the currently executing segment ends, and completion of execution of the current segment and selection of the next segment is awaited at block 865. After the next segment has been selected, execution of the multimedia work continues at block 835.

If it is determined at block 850 that space is available for loading resources for the next highest priority segment, those resources are loaded at block 855. At block 860, a determination is made as to whether there are any other segments on the loading priority list for the currently executing segment. If there are no more segments on the list, selection of the next segment to be executed is awaited at block 865.

If it is determined at block 860 that there are more segments on the loading priority list for the currently executing segment, execution continues at block 825.

FIGS. 10A–10D illustrate the movement of resources into and out of a playback device's internal memory according to the process of FIGS. 8A and 8B for the execution order shown in FIG. 9 for the multimedia work of FIG. 6. As shown in FIG. 9, in this embodiment, the segments of the multimedia work of FIG. 6 are executed in the sequence S1, S2, S6, S7. In this example, the resources for each of segments S1–S7 are considered to be equal to each other in size. In addition, the available internal memory of the playback device has the capacity for storing the resources required for any four of segments S1–S7.

FIG. 10A is a schematic diagram showing the resources contained in internal memory 1000 of a playback device executing the multimedia work of FIG. 6 after execution of segment S1 using the method of FIGS. 8A and 8B. As shown in FIG. 10A, at completion of execution of segment S1, memory 1000 contains the resources 1010 for the segment S1, as well as the resources 1020 and 1030 for segments S3 and S2, respectively, that have been pre-loaded in the order of priority specified in the first column of Table 11 according to the method of FIGS. 8A and 8B. At this point, execution of the multimedia work is at block 865 of FIG. 8B, awaiting selection of the next segment. Cross-hatching in FIG. 10A indicates the resources for the segment that has been executing, in this case segment S1.

According to FIG. 9, the next segment to be executed is segment S2. According to the method of FIGS. 8A and 8B, once segment S2 has been selected for execution, a check is made to determine whether the resources needed for segment S2 are already loaded in memory 1000, or whether those resources must be loaded before execution of segment S2 can begin. As shown in FIG. 10A, the resources 1030 for segment S2 already reside in memory 1000. Accordingly, execution of segment S2 can immediately begin.

While segment S2 is executing, the resources required for subsequent segments are pre-loaded according to the priority specified in the loading priority list for segment S2, namely column two of Table 11. Column two of Table 11 specifies that resources for segment S4 are to be pre-loaded first, followed by the resources for segment S6.

As shown in FIG. 10A, memory 1000 has space available for the resources for one additional segment in addition to the resources 1010, 1020, and 1030 for segments S1, S3, and S2, respectively, that are already resident in memory 1000. Accordingly, the resources for segment S4 can be immediately loaded into the available memory space of memory 1000. At this point the resources for segments S1, S3, S2 and S4 are resident in memory 1000.

Once the resources for segment S4 are loaded into memory 1000, memory 1000 is full. The resources for segment S6 cannot be loaded without purging memory 1000 of the resources for one of the other segments already resident in memory 1000.

According to the method of FIGS. 8A and 8B, a check is made as to whether the resources for any segment having a lower current priority than Segment S6 are resident in memory 1000. The only segments having a higher priority than segment S6 while segment S2 is executing are segment S2 (since it is the executing segment) and segment S4 (which has a higher priority according to Table 11). Accordingly, the resources for either of the remaining segments S1 or S3 may be purged to make room for the resources for segment S6. FIG. 10B shows the state of memory 1000 after the resources for segment S1 have been purged and the resources 1050 for segment S6 have been loaded into the freed-up memory space. As the resources for all segments listed in the loading priority list for segment S2 have now been loaded into memory, the state of memory 1000 shown in FIG. 10B continues until execution of segment S2 is completed and the next segment to be executed has been selected.

The process of purging resources for lower priority segments to make room for resources for higher priority segments continues as execution of the multimedia work follows the sequence shown in FIG. 9. Upon completion of execution of segment S2, segment S6 is selected for execution. Since, as shown in FIG. 20B, the resources 1050 for segment S6 are already resident in memory 1000, execution of segment S6 can immediately begin. The loading priority list for segment S6 is found in the sixth column of Table 11. The highest priority segment on the loading priority list for segment S6 is segment S4, followed by segment S7.

As shown in FIG. 10B, at the completion of execution of segment S2, the resources 1040 for segment S4 are already resident in memory 1000. Accordingly, the resources for segment S4 need not be loaded again. The resources for the second highest priority segment, segment S7, however, are not resident in memory 1000. Accordingly, the resources for segment S7 must still be loaded. As shown in FIG. 10B, memory 1000 at this point contains resources 1050, 1020, 1030 and 1040 for segments S6, S3, S2 and S4, respectively. Of these segments, segments S3 and S2 have a lower priority that segment S7. Therefore the resources for either segment S3 or segment S2 may be purged to make room for the resources for higher priority segment S7. FIG. 10C shows the state of memory 1000 after the resources 1020 for segment S3 have be en purged from memory 1000 and the resources 1060 for segment S7have been loaded into the freed-up space.

FIG. 10D shows the state of memory 1000 at the completion of execution of segment S7, which, according to the sequence of FIG. 9, is executed after segment S6. Here, the loading priority list for segment S7 (column seven of Table 11) specifies that the resources for segment S5 are to be pre-loaded first, followed by the resources for segment S7. As shown in FIG. 10D, the resources 1050 for segment S6 have been purged to make room for the resources 1070 for segment S5. The resources 1060 for segment S7 were already resident in memory 1000 and did not need to be reloaded.

In the embodiments of the invention described above, the priority factors for pre-loading resources for segments are derived from probability factors that are estimates of the probability that a segment will be the next segment to follow immediately after a currently executing segment. In other embodiments of the invention, priority factors are derived from probability factors that are estimates of the probability that a segment will at some point, not necessarily immediately, follow a currently executing segment. For example, in certain embodiments, probability factors are used that are estimates of the probability that a segment will be one of the next two, three, four or some other number of succeeding segments to follow a currently executing segment. In one embodiment, probability factors are used that are estimates of the overall probability that a segment will follow a currently executing segment at some time during execution of a multimedia work.

A variety of methods can be used to derive the probability factors of the present invention. Furthermore, the probability factors of the present invention can be dynamically updated and changed over time. In one embodiment, the probability factors for the possible transitions from a preceding segment to the possible succeeding segments are first set to initial values and then updated over time to correspond to probabilities obtained by observing actual execution of the work in practice. The initial values may be assigned by the author of a multimedia work, or may be set at generalized default values. For example, in one embodiment, the probability factors for each transition at the end of a segment are initially set to be equal. For example, if there are four possible transitions at the end of a segment, the probability factor for each transition is initially set to 0.25. These values are adaptively updated over time according to the observed operation of the work during execution. In one embodiment, different sets of probability factors are used for different users or categories of users, or different sets of probability factors may be selected based on other criteria. For example, one set of probability factors may be used for a user is a novice, while a different set is used for an experienced user. One set may be used during summer months, while another set is used during the winter. Any variety of other criteria can be used for selecting among multiple probability factor sets.

In certain embodiments of the invention, probability factors are derived by modeling an interactive multimedia work as a Markov state machine, with each segment of the multimedia work representing a state.

Figure 7A:
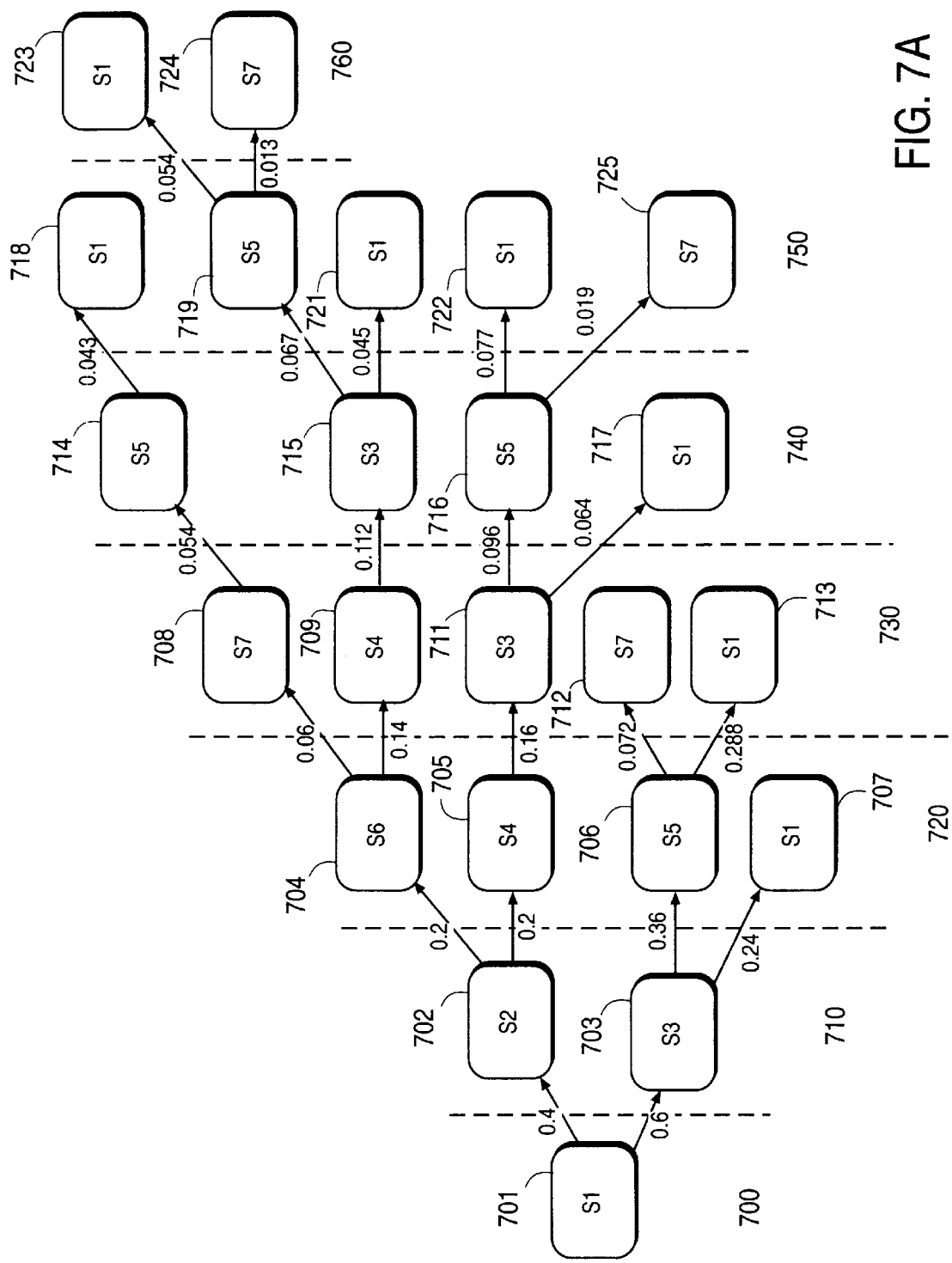
FIG. 7A is a block diagram illustrating a method used to derive probability factors for segment S1 of the multimedia work of FIG. 6.
Figure 7B:
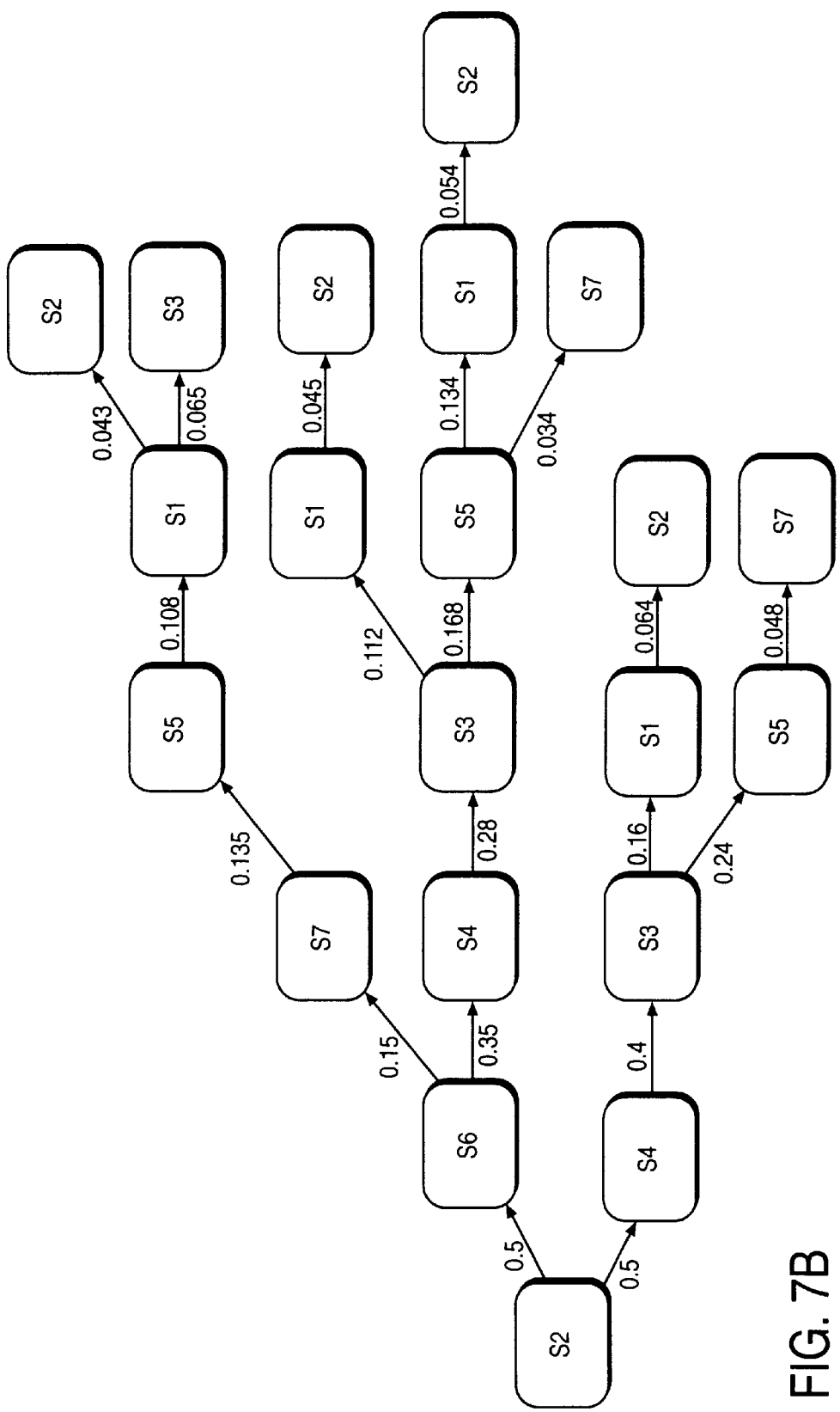
FIG. 7B is a block diagram illustrating a method used to derive probability factors for segment S2 of the multimedia work of FIG. 6.
Figure 7C:
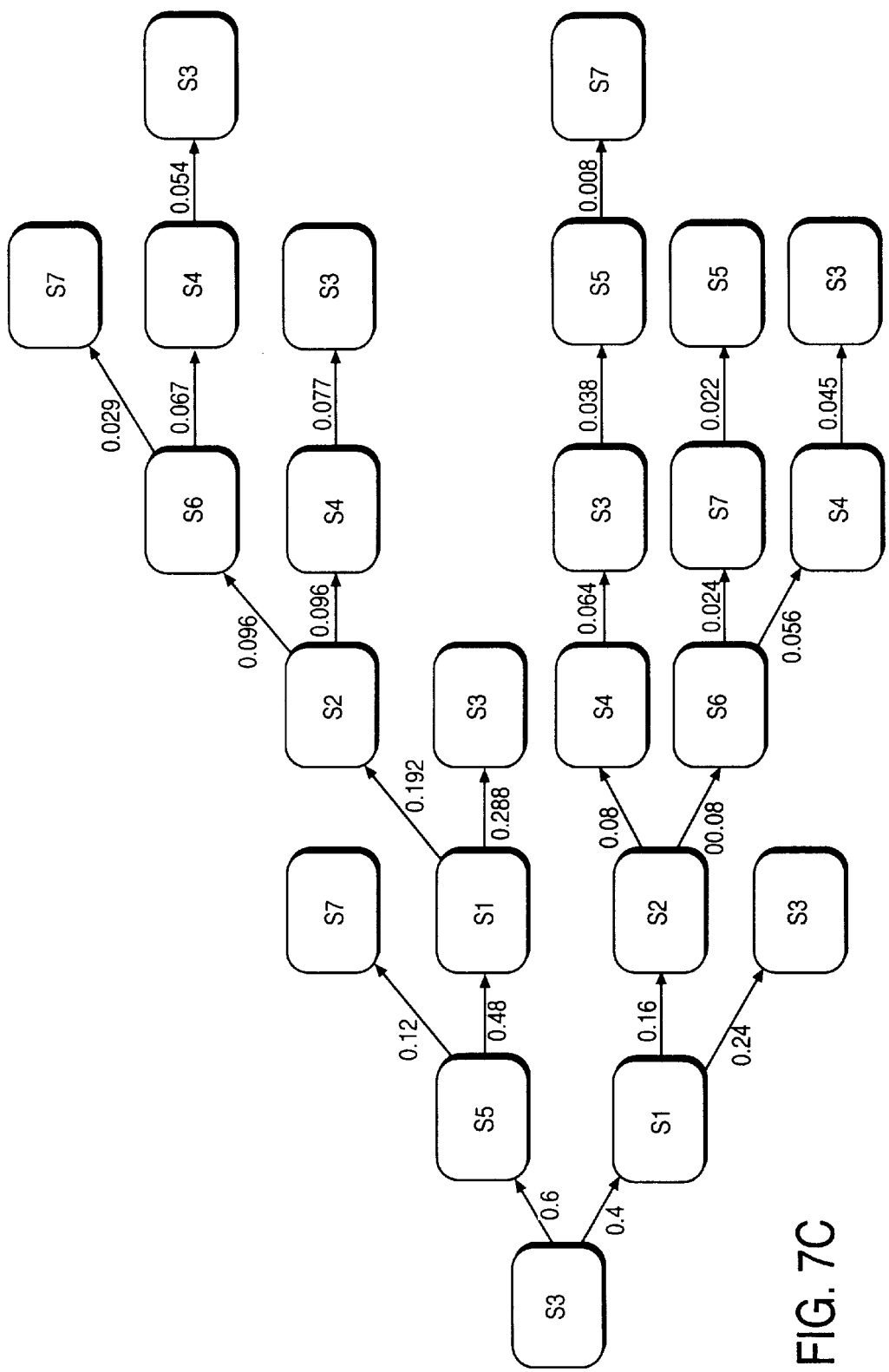
FIG. 7C is a block diagram illustrating a method used to derive probability factors for segment S3 of the multimedia work of FIG. 6.
Figure 7D:
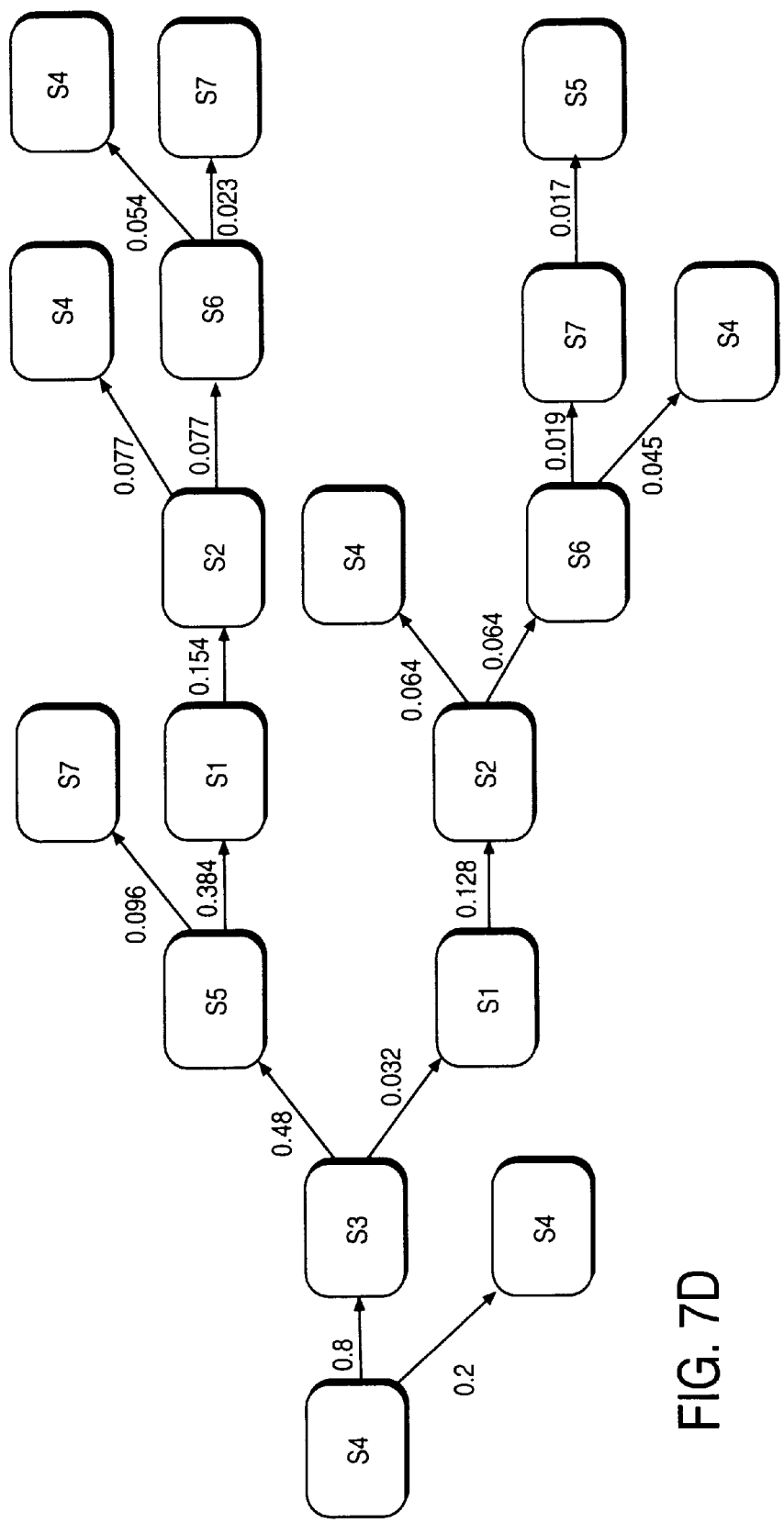
FIG. 7D is a block diagram illustrating a method used to derive probability factors for segment S4 of the multimedia work of FIG. 6.
Figure 7E:
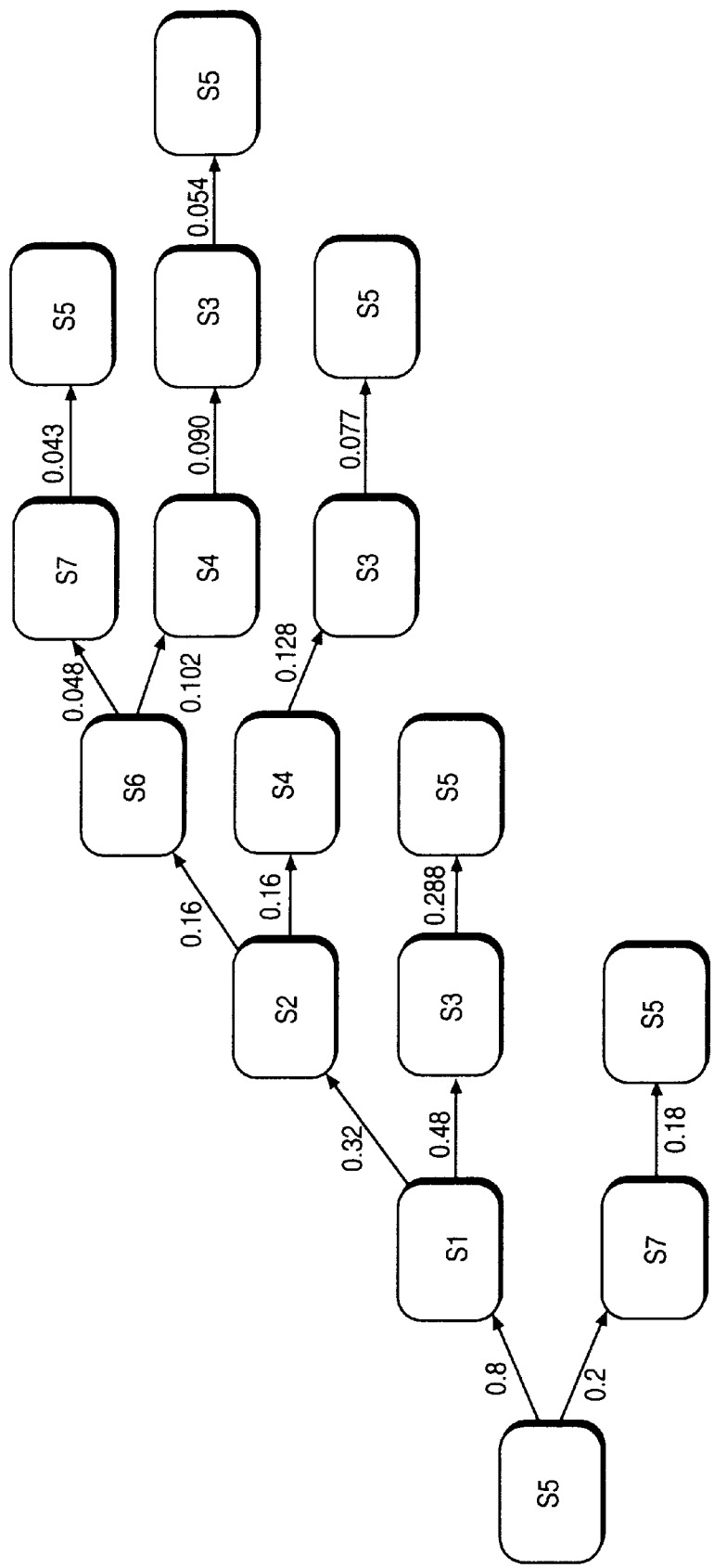
FIG. 7E is a block diagram illustrating a method used to derive probability factors for segment S5 of the multimedia work of FIG. 6.
Figure 7F:
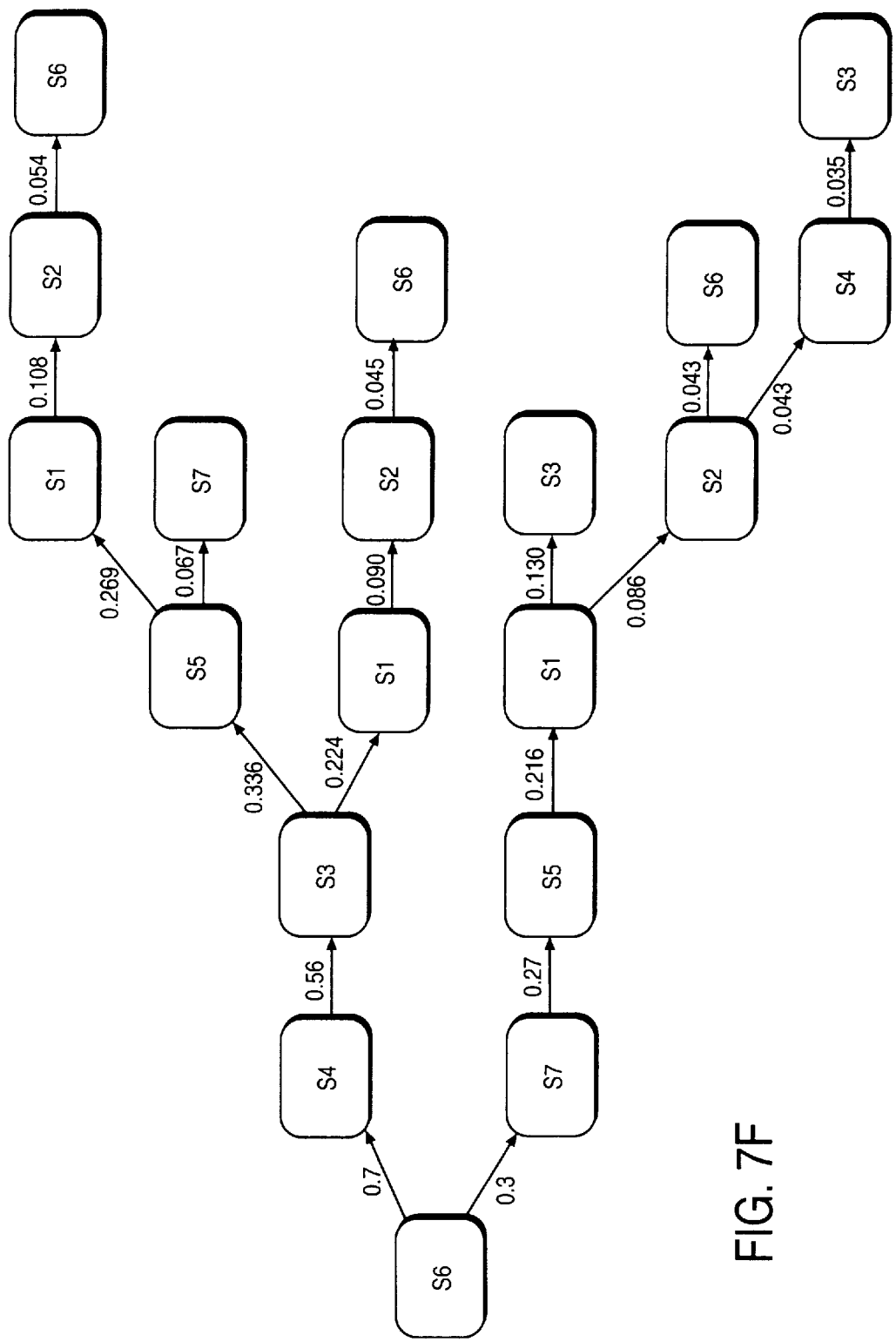
FIG. 7F is a block diagram illustrating a method used to derive probability factors for segment S6 of the multimedia work of FIG. 6.
Figure 7G:
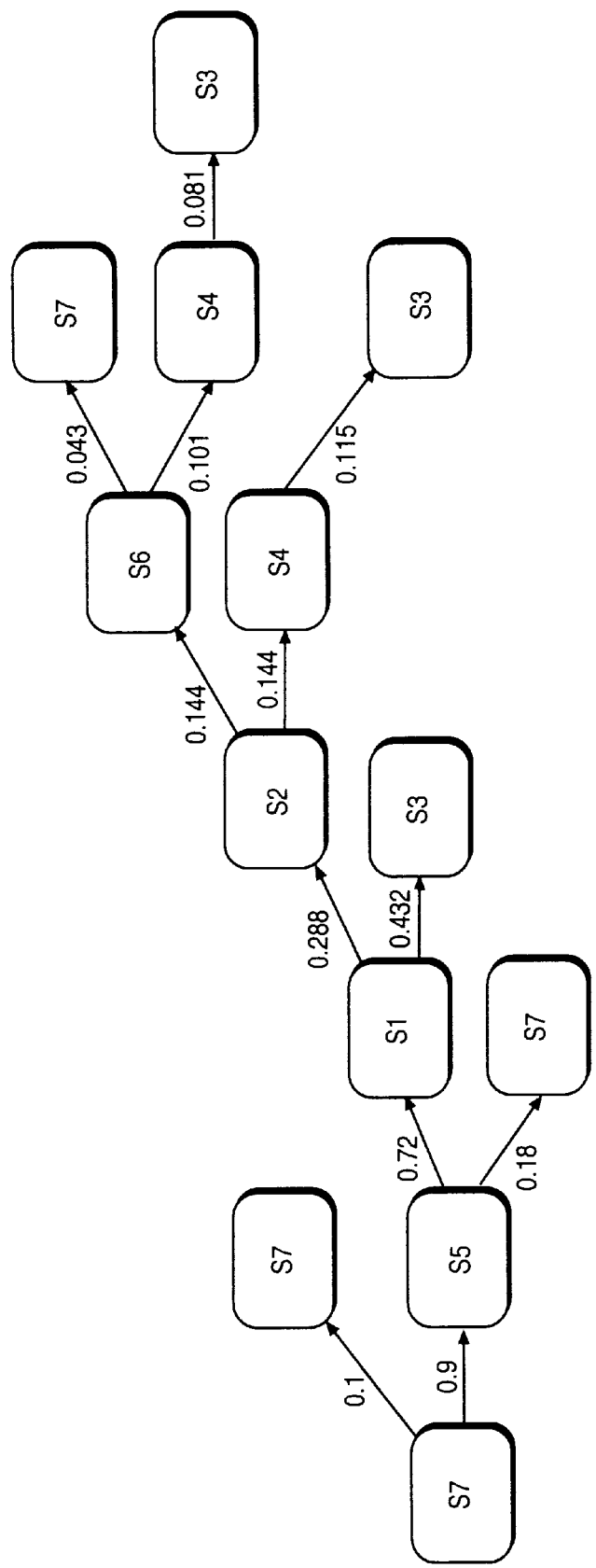
FIG. 7G is a block diagram illustrating a method used to derive probability factors for segment S7 of the multimedia work of FIG. 6.

FIGS. 7A–7F illustrate a method used in one embodiment of the invention to determine probability factors that are estimates of the probability that a segment will follow a currently executing segment, not necessarily directly, but at some point during execution of a multimedia work. FIG. 7A illustrates a method used to determine probability factors that represent estimates of the probability that a segment will follow segment S1 some time during the execution of the multimedia work of FIG. 6, using the probability factors that segments will immediately follow each other as shown in FIG. 6. The probability factors are determined by identifying alternative sequences of execution of the segments of the multimedia work of FIG. 6 that may follow execution of segment S1, and determining estimates of the probability that execution will proceed from segment S1 along each of the alternative sequences.

FIG. 7A is a probability tree illustrating sequences of segments that may follow execution of segment S1 given the structure of the multimedia work shown in FIG. 6. The probability tree of FIG. 7A is divided into tiers 700, 710, 720, 730, 740, 750, and 760. Tier 700 contains the currently executing segment S1. Tier 710 contains segments that may potentially directly follow execution of segment S1. Tier 720 contains segments that may potentially follow the segments in tier 710. Tier 730 contains segments that may potentially follow the segments in tier 720. Tier 740 contains segments that may potentially follow the segments in tier 730. Tier 750 contains segments that may potentially follow the segments in tier 740. Tier 760 contains segments that may potentially follow the segments in tier 750.

The probability tree of FIG. 7A may be constructed from the branches and probability factors shown in FIG. 6 as follows.

First, segment S1 701 is placed in first tier 700. According to FIG. 6, either segments S2 or S3 may follow segment S1. Accordingly, segments S2 702 and S3 703 are placed in second tier 710, with arrows connecting segment S1 701 with each of segments S2 702 and S3 703. Probability factors for the transitions from segment S1 701 to segments S2 702 and S3 703, respectively, obtained from FIG. 6, are indicated next to the arrows. FIG. 6 specifies a probability factor of 0.4 for the transition from segment S1 610 to segment S2 620 and a probability factor of 0.6 for the transition from segment S1 610 to segment S3 630.

Accordingly, in FIG. 7A, the transition from segment S1 701 to segment S2 702 is given a probability factor of 0.4, while the transition from segment S1 701 to segment S2 702 is given a probability factor of 0.6.

According to FIG. 6, either segments S6 660 or S4 640 may follow segment S2 620. Accordingly, segments S6 704 and S4 705 are placed in tier 720 of FIG. 7, with arrows indicating the transitions from segment S2 702 to segments S6 704 and S4 705, respectively. FIG. 6 specifies a probability factor of 0.5 for the transition from segment S2 620 to segment S6 660 and a probability factor of 0.5 for the transition from segment S2 620 to segment S4 640. The probability factors of interest in FIG. 7A are not the probability factors for transitions from segment S2 702 to segments S6 704 and S4 705, respectively, but the compound probability factors for the transitions from segment S1 701 to segment S2 702 to segment S6 704, and from segment S1 701 to segment S2 702 to segment S4 705, respectively. The probability factors for these transitions are obtained by taking the product of the probability factors for each step in these transitions. For example, the probability factor for going from segment S1 to segment S2 is 0.4, while the probability factor for going from segment S2 to segment S6 is 0.5. Accordingly, the probability factor for going from segment S1 to segment S2 to segment S6 is 0.4×0.5 or 0.2. Accordingly, a probability factor of 0.2 is indicated next to the arrow indicating the transition from segment S2 702 to segment S6 704.

The probability factors for the remaining transitions from segment S2 702 to segment S4 705 and from segment S3 703 to segments S5 706, and S1 707 in tier 720 are determined in a similar manner.

Each subsequent tier of the probability tree of FIG. 7A, in one embodiment of the invention, is obtained by determining the transitions possible from the segments contained in the previous tier, taking account, in this embodiment, of the restriction that no segment appears twice in any path from segment S1 in tier 701 to any subsequent segment. In this manner the longest unique paths from each segment to each other segment may be determined. For example, one of the segments in fourth tier 730 is segment S7 712. According to FIG. 6, transitions from segment S7 can occur back to the beginning of segment S7 and to segment S5. The path from segment S1 701 in first tier 700 to segment S7 712 in fourth tier 730 includes segments S3, S5 and S7. This path already includes a segment S5 and a segment S7. If a transition from segment S7 712 to either of segments S5 or S7 were added to the probability tree of FIG. 7A, two copies of segments S5 or S7, respectively, would be included in the path from segment S1 701 to the either of these segments S5 or S7. Such multiple copies would produce incorrect probability factors. Accordingly, no transitions from segment S7 712 are shown in FIG. 7A. The path from segment S1 701 to segment S3 703 to segment S5 706 to segment S7 712 thus ends at segment S7 712. For similar reasons, other execution paths end at segment S1 713 in tier 730, segment S1 717 in tier 740, segments S1 718, S1 721, S1 722 and S7 725 in tier 750, and segments S1 723 and S7 724 in tier 760.

The probability factor for each transition in a tier is determined by taking the product of the probability factors from FIG. 6 for each step in the transition from segment S1 701 in tier 700 to that segment. For example, the transition from segment S1 701 to segment S3 715 in tier 740 consists of the steps segment S1 701 to segment S2 702 to segment S6 704 to segment S4 709 to segment S3 715. According to FIG. 6, a step from segment S1 to segment S2 has a probability factor of 0.4. A step from segment S2 to segment S6 has a probability factor of 0.5. A step from segment S6 to segment S4 has a probability factor of 0.7. A step from segment S4 to segment S3 has a probability factor of 0.8. The overall probability factor for the transition from segment S1 701 to segment S3 715 thus is the product of 0.4×0.5×0.7×0.8=0.112, as indicated in FIG. 7A. The other probability factors in FIG. 7A are calculated in the same manner.

Given the probability factors of FIG. 7A, probability factors can be determined that represent estimates of the probability that each of segments S1–S7 will follow execution of segment S1 overall or within a specified number of segments.

For example, a probability factor that represents an estimate of the probability that segment S3 will follow segment S1, in the multimedia work of FIG. 6, within three segments after execution of segment S1, is determined by taking the sum of the probability factors indicated in FIG. 7A for transitions to each instance of segment S3 found within the first four tiers 700, 710, 720 and 730. As shown in FIG. 7A, segment S3 appears twice in these tiers: as segment S3 703 in tier 710, and as segment S3 711 in tier 730. The transition to segment S3 703 has an indicated probability factor of 0.6. The transition to segment S3 711 has an indicated probability factor of 0.16. The total probability factor that segment S3 will follow segment S1 within three segments in the multimedia work of FIG. 6 is therefore 0.6+0.16=0.76.

To find the probability factor that segment S3 will follow segment S1 overall during execution of the multimedia work of FIG. 6, the probability factors for the transitions to all instances segments S3 appearing in FIG. 7A are added together. In addition to segment S3 703 and segment S3 711 that appear in tiers 700 to 730, segment S3 appears one other time as segment S3 715 in tiers 740–760. The overall probability factor that segment S3 will follow segment S1 during execution of the multimedia work of FIG. 6 is therefore 0.6+0.16+0.112=0.872.

Table 12 lists the probability factors P11–P17 that a segment will follow segment S1 of the multimedia work of FIG. 6 within one, two, three, four and five segments, and overall.

TABLE 12

| | No. of Segments | | | | | |
|---|---|---|---|---|---|---|
| | 1 | 2 | 3 | 4 | 5 | Overall |
| P11 | 0 | 0.24 | 0.528 | 0.592 | 0.757 | 0.811 |
| P12 | 0.4 | 0.4 | 0.4 | 0.4 | 0.4 | 0.4 |
| P13 | 0.6 | 0.6 | 0.76 | 0.872 | 0.872 | 0.872 |
| P14 | 0 | 0.2 | 0.34 | 0.34 | 0.34 | 0.34 |
| P15 | 0 | 0.36 | 0.36 | 0.51 | 0.577 | 0.577 |
| P16 | 0 | 0.14 | 0.14 | 0.14 | 0.14 | 0.14 |
| P17 | 0 | 0 | 0.132 | 0.132 | 0.151 | 0.164 |
| | | | Probability Factors | | | |

For an embodiment in which the time cost factor is considered to be constant for each segment, the priority factor for a segment will be equal to its probability factor. In this embodiment, the probability factors of Table 12 directly determine the loading priority for loading resources for subsequent segments while segment S1 is executing. Table 13 lists the loading priority for segment S1 corresponding to the probability factors of Table 12. In this embodiment, since the resources for segment S1 are already loaded (since segment S1 is executing), segment S1 is omitted form the loading priority list, regardless of the value of its priority factor.

TABLE 13

| Loading Priority per No. of Segments | | | | | |
|---|---|---|---|---|---|
| 1 | 2 | 3 | 4 | 5 | Overall |
| S3 | S3 | S3 | S3 | S3 | S3 |
| S2 | S2 | S2 | S5 | S5 | S5 |
| | S5 | S5 | S2 | S2 | S2 |
| | S4 | S4 | S4 | S4 | S4 |
| | S6 | S6 | S6 | S7 | S7 |
| | | S7 | S7 | S6 | S6 |

As shown in Table 13, the priority for pre-loading resources while segment S1 is executing may change depending on which of the probability factors of Table 12 are used. In one embodiment of the invention, the number of segments following a currently executing segment that are considered for determining probability factors, and hence priority factors, is dependent on the amount of memory a playback device has available compared to the size of the resources required for each segment. The more memory there is available, the greater the number of segments following an executing segment that are considered in determining the probability factor used.

FIGS. 7B–7G show probability trees for segments S2–S7, respectively, constructed from FIG. 6 in the same manner as the probability tree for segment S1 in FIG. 7A. From each of these probability trees, probability factors may be calculated in the same manner as the probability factors of Table 12 are calculated from the probability tree of FIG. 7A. The probability factors obtained from FIGS. 7A–7G can be used to assemble a probability factor matrix in the form of Table 5. This probability factor matrix can be used to obtain a priority factor matrix and corresponding loading priority lists in the same manner as the probability factor matrix of Table 6 was used to obtain the loading priority lists of Table 11. Table 14 contains a probability factor matrix in the form of Table 5 for the probability factors that a segment will follow an executing segment overall, at some point during execution of the multimedia work, derived from the probability trees of FIGS. 7A–7G. Table 15 contains the resulting loading priority lists for each segment obtained using the time cost factors of Table 8.

TABLE 14

| | S1 | S2 | S3 | S4 | S5 | S6 | S7 |
|---|---|---|---|---|---|---|---|
| S1 | 0.811 | 0.4 | 0.872 | 0.34 | 0.577 | 0.14 | 0.164 |
| S2 | 0.514 | 0.206 | 0.745 | 0.85 | 0.543 | 0.5 | 0.232 |
| S3 | 0.88 | 0.352 | 0.768 | 0.227 | 0.650 | 0.176 | 0.181 |
| S4 | 0.704 | 0.282 | 0.8 | 0.440 | 0.497 | 0.141 | 0.138 |
| S5 | 0.8 | 0.32 | 0.698 | 0.262 | 0.642 | 0.16 | 0.248 |
| S6 | 0.709 | 0.284 | 0.725 | 0.743 | 0.606 | 0.142 | 0.367 |
| S7 | 0.72 | 0.288 | 0.628 | 0.245 | 0.9 | 0.144 | 0.323 |
| | | | Overall Probability Factors | | | | |

TABLE 15

| Currently Executing Segment | | | | | | |
|---|---|---|---|---|---|---|
| S1 | S2 | S3 | S4 | S5 | S6 | S7 |
| S3 | S4 | S1 | S3 | S1 | S4 | S5 |
| S5 | S3 | S5 | S1 | S3 | S3 | S1 |
| S2 | S5 | S2 | S5 | S2 | S1 | S3 |

TABLE 15-continued

Currently Executing Segment

| S1 | S2 | S3 | S4 | S5 | S6 | S7 |
|----|----|----|----|----|----|----|
| S4 | S1 | S4 | S2 | S4 | S5 | S2 |
| S7 | S6 | S7 | S6 | S7 | S7 | S4 |
| S6 | S7 | S6 | S7 | S6 | S2 | S6 |

Loading Priority

In one embodiment of the invention, the loading priority lists of Table 15 are used with the method of FIG. 8 in the same manner as describe above with respect to the loading priority lists of Table 11.

Depending on the embodiment of the invention, the order in which resources are preloaded into the memory of a playback device may be controlled by the playback device (client driving model) or the storage device (server driving model).

In the client driving model, the client processor has available a probability model of the multimedia work being executed, for example a representation of the model shown in FIG. 6. The client processor also has a available a model of the storage device and the communications channel between the storage device and the playback device that allows the client processor to determine time cost factors for retrieving resources from the storage device. The client processor also has access to a memory map that describes the current memory locations of segments and resources, as well as the amount and location of available memory. The client processor is therefore able to determine and use the loading priority lists of the present invention.

In the server driving model, the order of preloading resources is controlled by the server storage device. The server driving model may be implemented, for example, in an embodiment in which the segments of the multimedia work are in the form of HTML web pages and the server storage device is an Internet or intranet web page server. In this embodiment, the server's processor has available to it a probability model of the multimedia work being executed, for example a representation of the model shown in FIG. 6. The server's processor also has a available a model of the server's storage devices and of the communications channel between the server and the client playback device that allows the server's processor to determine time cost factors for retrieving resources from its storage devices and transmitting them to the client playback device. The server processor is therefore able to determine the loading priority lists of the present invention for the segments of a multimedia work.

To determine the manner in which to apply the loading priority lists according to the present invention, the server's processor must know the status of the client playback device's memory. Accordingly, in one embodiment, a request for a segment of a multimedia work from a client playback device to a server storage device includes a memory map of the client playback device indicating locations at which resources of the multimedia work are already contained in the client playback device's memory, and identifying available memory locations for loading additional resources. Using this information, the server is able to determine the order in which to send resources to the client playback device, using, for example, the method of FIGS. 8A and 8B. The server may send resources for the requested segment, as well as resources to be preloaded for succeeding segments, to the client. The client in one embodiment is obligated to accept whatever resources the server sends to the client. The server is also able to determine whether there are any lower priority resources at the client playback device that can be purged to make memory space available for higher priority resources. In one embodiment, the server sends commands to the client playback device to purge lower priority resources when needed to make room for higher priority resources.

In one embodiment of the present invention, resources for a multimedia work are stored on a storage device according to the loading priority lists of the present invention to reduce the disk access (seek and read) time required to retrieve the resources for the multimedia work. In one embodiment, resources are stored on successive sectors of a storage media in the order specified in a loading priority list of the present invention.

Figure 11:
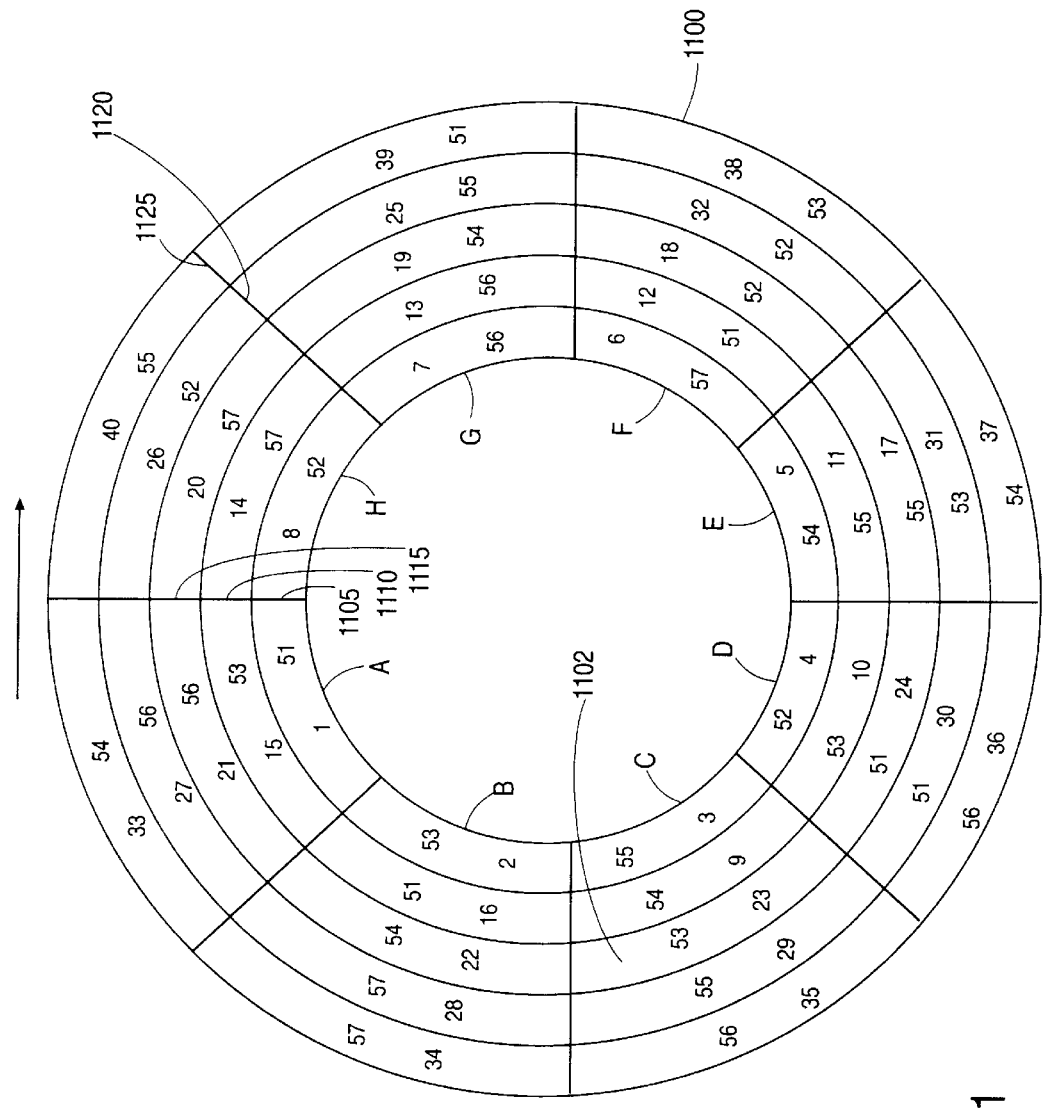
FIG. 11 is a schematic diagram of a disk drive storage medium used to store resources of a multimedia work in one embodiment of the present invention.

FIG. 11 is a schematic diagram of a disk drive storage medium such as a hard disk drive or CD-ROM on which the resources for the multimedia work of FIG. 6 may be stored according to the loading priority list of Table 15.

As shown in FIG. 11, disk storage medium 1100 includes a storage area 1102 including a number of concentric bands. A typical disk storage medium features several thousand bands, each of which is divided into several hundred segments. For simplification, only five bands 1105, 1110, 1115, 1120 and 1125, magnified in size, are shown on disk storage medium 1100 of Figure, each of which, for simplification, are divided into eight segments a, b, c, d, e, f, g and h. Each segment in FIG. 11 can be identified by its band number and segment letter, such as, for example, segment 1115c, segment 1105g, etc.

In the embodiment of FIG. 11, disk storage medium 1100 rotates in a clockwise direction when data is read. Data is read as segments containing data pass the read head of the disk drive device that contains disk storage medium 1100. To read a particular segment, the read head is moved radially with respect to disk storage medium 1100 until the read head is positioned adjacent to the band in which the segment is located. The segment is read when the rotation of disk storage medium 1100 causes the segment to pass adjacent to the read head.

The seek time it takes for the read head to be positioned for reading a particular segment is dependent on the time it takes for the read head to be moved radially across the disk storage medium to the appropriate band in which the segment is located together with the time it takes for the disk storage medium to rotate sufficiently such that the desired segment passes adjacent to the read head. The seek time between segments may be minimized by placing segments to be read sequentially in consecutive sector locations on the disk storage medium. For example, if the first segment that is read is segment 1105a, seek time is reduced if the next segment to be read is the immediately adjacent segment 1105b. There is no seek time between reading segment 1105a and 1105b because after reading segment 1105a, the read head need not change in position, and rotation of disk storage medium 1100 will cause segment 1105b to pass adjacent to the read head immediately after segment 1105a.

FIG. 11 shows a sequence of reading segments in a manner that reduces seek time between segments. The order of reading segments is indicated by the numbers 1–40 marked in the segments. As shown in FIG. 11, the first segment to be read (as indicated by the numeral 1) is segment a of band 1105. The segments that follow are band 1105, segments b, c, d, e, f, g, h (numerals 2–8); then band 1110, segments c, d, e, f, g, h, a, b (numerals 9–16); then band 1115, segments e, f, g, h, a, b, c, d (numerals 17–24); then band 1120, segments g, h, a, b, c, d, e, f (numerals 25–32); and finally band 1125, segments a, b, c, d, e, f, g, h (numerals 33–40). In this sequence, segments within a single band are read sequentially, but when moving from one band to the next, in this embodiment, the first two segments of the new band are skipped to allow time for the read head to move radially to the new band.

FIG. 11 illustrates how resources of the multimedia work of FIG. 6 are stored on the disk drive storage medium 1100 in one embodiment of the present invention based on the loading priority lists of Table 15. In the embodiment of FIG. 11, for simplification, each segment of a band of disk storage medium 1100 is assumed to be able to store the resources required for one segment of the multimedia work of FIG. 6.

For a multimedia work being executed according to the present invention, resources are retrieved from storage and loaded into a playback device's memory in an order based on loading priority lists, such as the loading priority lists of Table 15. Seek time for retrieving these resources from a disk storage medium such as disk storage medium 1100 of FIG. 11 can be reduced by storing the resources on disk storage medium in the order in which they are retrieved.

The first column of Table 15 indicates the loading priority for resources for the segments of the multimedia work of FIG. 6 when segment S1 is being executed. When execution of the multimedia work of FIG. 6 is first begun, and S1 is selected for execution first, the resources for S1 are loaded first, followed, according to Table 15, by the resources for segments S3, S5, S2, S4, S7 and S6. Accordingly, in FIG. 11, resources for segments S1, S3, S5, S2, S4, S7 and S6 are stored in this order in segments indicated by numerals 1–7 of disk storage media 1100. The seek time for reading resources for segments in the order specified in the first column of Table 15 is reduced by storing these resources in the same order in which they are read in disk storage media 1100.

By storing resources in the order specified in the first column of Table 15 on disk storage medium 1100, seek time is reduced when segment S1 is being executed and resources are being preloaded according to the loading priority list for segment S1. However, if another segment is being executed, the loading priority list changes. In one embodiment of the invention, multiple copies of resources of a multimedia work are stored, to the extent possible, on a disk drive storage medium to reduce seek time during preloading of resources when segments other than segment S1 are executing.

In the embodiment of FIG. 11, a complete, first set of the resources for the segments of the multimedia work of FIG. 6 are stored in the segments numbered 1–7 of disk storage medium 1100. Additional copies of the resources for segments of the multimedia work of FIG. 6 are stored in the remaining segments 8–40. In this embodiment, resources for the segments of the multimedia work are stored in the order specified in the second column of Table 15, namely segments S2, S4, S3, S5, S1, S6 and S7, in segments numbered 8–14, respectively, of disk storage medium 1100. Accordingly, while segment S2 is executing, the resources for the remaining segments can be read and pre-loaded in the order specified in the second column in Table 15 with reduced seek time by reading the resources from segments 8–14 of disk storage medium 1100.

Because space is available, further copies of the resources required by segments S1–S7 of the multimedia work of FIG. 6 are stored in disk storage medium 1100. Thus segments 15–21 contain the resources for segments S1–S7 in the order specified in the third column of Table 15; segments 22–28 contain the resources for segments S1–S7 in the order specified in the fourth column of Table 15; segments 29–35 contain the resources for segments S1–S7 in the order specified in the fifth column of Table 15, and segments 36–40 contain the resources for the first five segments specified in the sixth column of Table 15 (namely segments S6, S4, S3, S1 and S5, respectively).

In the embodiment of FIG. 11, resources for all segments in a column of Table 15 are stored in order on consecutive segments of disk storage medium 1100. In other embodiments, resources for only the first several segments specified in each loading priority list for a segment are loaded sequentially on a disk storage medium. For example, in one embodiment, the resources for the first four segments specified in the loading priority list for a segment are stored sequentially on the disk storage device, followed by the resources for the first four segments on the loading priority list for the next segment, and so on. For example, in one embodiment, the resources for the first four segments for the loading priority list for segment S1 from Table 15 (namely segments S1, S3, S5 and S2) are stored in segments 1–4 of disk storage medium 1100. Resources for the first four segments for the loading priority list for segment S2 (namely segments S2, S4, S3 and S5) are stored in the next four segments (5–8) of disk storage medium 1100, and so on. In this way, less storage space is required than if resources for all seven segments on each segment's priority list are stored separately for each executing segment, yet seek time is still improved.

In one embodiment of the invention, actual execution of a multimedia work is observed and probability factors are derived and updated based on the observed frequency of transitions between segments. In that way, the probability factors used to derive the loading priority lists of the present invention can more accurately estimate the real probabilities for transitions between segments of the multimedia work. In one embodiment of the invention, separate probability factors are derived for different users or sets of users. In one embodiment, in which the multimedia work is, for example, a computer game, separate probability factors are derived for different levels (for example, beginner, intermediate, expert) levels of play. In one embodiment, separate probability factors are derived for individual users of a multimedia work, based on observations of the use history for the individual users.

Thus, a method and apparatus for delivery and playback of interactive titles has been described. Although the present invention has been described with respect to certain example embodiments, it will be apparent to those skilled in the art that the present invention is not limited to these specific embodiments. For example, other cost factors, such as storage or bandwidth cost factors, can be used with the present invention in the same manner as the time cost factor to derive the priority factors of the present invention. Also, although the probability factor has been described as an estimate of the probability that one segment will follow another segment, there need not be any actual relationship between the probability factor and any actual probability. An author may assign any desired number to the probability factor without departing from the scope of the present invention. Further, although the operation of certain embodiments has been described in detail using certain detailed process steps, some of the steps may be omitted or other similar steps may be substituted without departing from the scope of the invention. Other embodiments incorporating the inventive features of the present invention will be apparent to those skilled in the art.

What is claimed is:

1. A method for presenting a multimedia work on a playback device comprising the steps of:
    loading resources required for presenting a first segment of said multimedia work on said playback device into memory accessible by said playback device;
    presenting said first segment of said multimedia work on said playback device;
    identifying possible alternative succeeding segments that may be selected for presentation subsequent to said first segment;
    assigning a priority ranking to said possible alternative succeeding segments of said first segment wherein said step of assigning a priority ranking to possible succeeding segments of said first segment comprises the steps of:
        assigning a probability factor that represents an estimate of the likelihood each of said possible succeeding segments will be selected;
        assigning a cost factor that represents an estimate of the time used to present each of said possible succeeding segments to said playback device;
        deriving said priority ranking from said probability factors and said cost factors;
    loading resources required by said possible succeeding alternative segments into memory accessible by said playback device according to said priority ranking.

2. The method of claim 1 wherein said step of loading resources required by said possible succeeding segments into memory accessible by said playback device according to said priority ranking comprises the steps of:
    identifying a possible succeeding segment having a first highest priority ranking;
    identifying any remaining resources required for presenting said possible succeeding segment having said first highest priority ranking on said playback device that have not been previously loaded into said memory accessible by said playback device;
    loading said any remaining resources required for presenting said possible succeeding segment having said first highest priority ranking into said memory accessible by said playback device.

3. The method of claim 1 wherein said resources for said possible succeeding segments are stored on a storage device connected to said playback device by a communications means.

4. The method of claim 3 wherein said storage device comprises a rotating storage medium.

5. The method of claim 4 wherein said rotating storage medium comprises a rewritable rotating storage medium.

6. The method of claim 4 wherein said rotating storage medium comprises a read-only storage medium.

7. The method of claim 4 wherein said rotating storage medium comprises a CD-ROM.

8. The method of claim 4 wherein said rotating storage medium comprises a DVD disk.

9. The method of claim 3 wherein said storage device comprises a fixed storage medium.

10. The method of claim 9 wherein said fixed storage medium comprises random access memory.

11. The method of claim 3 wherein said storage device comprises a magnetic tape storage device.

12. The method of claim 3 wherein said communications means comprises a data communications network.

13. The method of claim 3 wherein said communications means comprises a computer bus.

14. The method of claim 2 wherein said step of loading said any remaining resources required for presenting said possible succeeding segment having said first highest priority ranking into said memory accessible by said playback device comprises the step of:
    determining whether said memory accessible by said playback device has sufficient memory space available for loading said remaining resources;
    if said playback device does not have said sufficient memory space available, determining whether any resources for any segments of said multimedia work having a lower priority ranking than said possible succeeding segment having said first highest priority ranking are loaded into said memory;
    if a resource for a segment of said multimedia work having a lower priority ranking than said possible succeeding segment having said first highest priority ranking is loaded into said memory, purging said resource to make room for a portion of said remaining resources.

15. The method of claim 1 wherein said probability factor comprises an estimate of a probability that said possible succeeding segment will be presented subsequent to said first segment.

16. The method of claim 15 wherein said probability factor comprises an estimate of a probability that said each possible succeeding segment will be presented immediately subsequent to said first segment.

17. The method of claim 15 wherein said probability factor comprises an estimate of a probability that said each possible succeeding segment will be presented within a plurality of segments subsequent to said first segment.

18. The method of claim 1 wherein said cost factor comprises an estimate of a relative time cost required to obtain resources required by said each possible succeeding segment.

19. The method of claim 1 wherein said cost factor comprises an estimate of a relative storage cost required to obtain resources required by said each possible succeeding segment.

20. The method of claim 1 wherein said cost factor comprises an estimate of a relative bandwidth cost required to obtain resources required by said each possible succeeding segment.

21. The method of claim 1 wherein said probability factors are derived from observations of presentation sequences of segments of said multimedia work.

22. The method of claim 1 wherein said probability factors are derived dynamically and updated during execution of said multimedia work.

23. The method of claim 1 wherein said probability factors depend on a characteristic of a user.

24. The method of claim 1 wherein said probability factors depend on an external parameter.

25. The method of claim 1 wherein said step of assigning a priority ranking to said possible succeeding segments of said first segment comprises the steps of:
    identifying a parameter of a user of said playback device;
    assigning said priority ranking based upon said parameter of said user.

26. The method of claim 3 wherein said step of loading resources required by said possible succeeding segments into memory accessible by said playback device according to said priority ranking is controlled by said storage device.

27. The method of claim 1 wherein said resources comprise application program data.

28. The method of claim 1 wherein said resources comprise media data.

29. A method for storing resources of a multimedia work on a storage device comprising the steps of:
   identifying possible alternative succeeding segments that may be selected for presentation during playback of said multimedia work subsequent to presenting a first segment of said multimedia work;
   assigning a first priority ranking to said possible alternative succeeding segments of said first segment wherein said step of assigning a first priority ranking to possible succeeding segments of said first segment comprises the steps of:
      assigning to each of said possible succeeding segments a probability factor that represents an estimate of the likelihood each of said possible succeeding segments will be selected;
      assigning a cost factor that represents an estimate of the time used to present each of said possible succeeding segments for playback;
      deriving said first priority ranking from said probability factors and said cost factors;
      storing resources required by said possible alternative succeeding segments on said storage device according to said first priority ranking.

30. The method of claim 29 wherein said storage device comprises rotating storage medium.

31. The method of claim 30 wherein said rotating storage medium comprises a rewritable rotating storage medium.

32. The method of claim 30 wherein said rotating storage medium comprises a read-only storage medium.

33. The method of claim 30 wherein said rotating storage medium comprises a CD-ROM.

34. The method of claim 30 wherein said rotating storage medium comprises a DVD disk.

35. The method of claim 30 wherein said storage device comprises a fixed storage medium.

36. The method of claim 35 wherein said fixed storage medium comprises random access memory.

37. The method of claim 30 wherein said storage device comprises a magnetic tape storage device.

38. The method of claim 30 wherein said probability factor comprises an estimate of a probability that said each possible succeeding segment will be presented subsequent to said first segment.

39. The method of claim 30 wherein said probability factor comprises an estimate of a probability that said each possible succeeding segment will be presented immediately subsequent to said first segment.

40. The method of claim 30 wherein said probability factor comprises an estimate of a probability that said each possible succeeding segment will be presented within a plurality of segments subsequent to said first segment.

41. The method of claim 30 wherein said time cost factor comprises an estimate of a relative time cost required to obtain resources required by said each possible succeeding segment.

42. The method of claim 30 wherein said cost factor comprises an estimate of a relative storage cost required to obtain resources required by said each possible succeeding segment.

43. The method of claim 30 wherein said cost factor comprises an estimate of a relative bandwidth cost required to obtain resources required by said each possible succeeding segment.

44. The method of claim 29 wherein said resources comprise application program data.

45. The method of claim 29 wherein said resources comprise media data.

46. The method of claim 29 further comprising the steps of:
   identifying possible succeeding segments that may be selected for presenting during playback of said multimedia work subsequent to presenting a second segment of said multimedia work;
   assigning a second priority ranking to said possible succeeding segments of said second segment;
   storing resources required by said possible succeeding segments of said second segment on said storage device according to said second priority ranking.

47. A method for storing resources of a multimedia work on a storage device comprising the steps of:
   identifying possible alternative succeeding segments that may be selected for presentation during playback of said multimedia work subsequent to presenting a first segment of said multimedia work;
   assigning a first priority ranking to said possible alternative succeeding segments of said first segment wherein said step of assigning a priority ranking to possible succeeding segments of said first segment comprises the steps of:
      assigning to each of said possible succeeding segments a probability factor that represents an estimate of the likelihood each of said possible segments will be selected;
      assigning a cost factor that represents an estimate of the time used to present each of said possible succeeding segments for playback;
      deriving said first priority ranking from said probability factors and said cost factors.

48. The method of claim 47 wherein said storage media comprises a CD-ROM.

49. The method of claim 47 wherein said storage media comprises a DVD disk.

50. The method of claim 47 wherein said storage device comprises a magnetic tape storage device.

51. The method of claim 47 wherein said probability factor comprises an estimate of a probability that said each possible succeeding segment will be presented subsequent to said first segment.

52. The method of claim 47 wherein said probability factor comprises an estimate of a probability that said each possible succeeding segment will be presented immediately subsequent to said first segment.

53. The method of claim 47 wherein said probability factor comprises an estimate of a probability that said each possible succeeding segment will be presented within a plurality of segments subsequent to said first segment.

54. The method of claim 47 wherein said cost factor comprises an estimate of a relative time cost required to obtain resources required by said each possible succeeding segment.

55. The method of claim 47 wherein said cost factor comprises an estimate of a relative storage cost required to obtain resources required by said each possible succeeding segment.

56. The method of claim 47 wherein said cost factor comprises an estimate of a relative bandwidth cost required to obtain resources required by said each possible succeeding segment.

57. The method of claim 47 wherein said resources comprise application program data.

58. The method of claim 47 wherein said resources comprise media data.

59. The method of claim 47 further comprising second copies of said resources stored according to a second priority ranking obtained by using the method steps of:
    identifying possible succeeding segments that may be selected for presenting during playback of said multimedia work subsequent to presenting a second segment of said multimedia work;
    assigning a second priority ranking to said possible succeeding segments of said second segment.

60. A program storage device readable by a machine tangibly embodying a program of instructions executable by the machine to perform method steps for presenting a multimedia work on a playback device, said method comprising the steps of:
    loading resources required for presenting a first segment of said multimedia work on said playback device into memory accessible by said playback device;
    presenting said segment of said multimedia work on said playback device;
    identifying possible alternative succeeding segments that may be selected for presentation subsequent to said first segment;
    assigning a priority ranking to said possible alternative succeeding segments of said first segment wherein said step of assigning a priority ranking to possible succeeding segments of said first segment comprises the steps of:
        assigning to each of said possible succeeding segments a probability factor that represents an estimate of the likelihood each of said possible succeeding segments will be selected;
        assigning a cost factor that represents an estimate of the time used to present each of said possible succeeding segments to said playback device;
        deriving said priority ranking from said probability factors and said cost factors;
        loading resources required by said possible alternative succeeding segments into memory accessible by said playback device according to said priority ranking.

61. The program storage device of claim 60 wherein said step of loading resources required by said possible succeeding segments into memory accessible by said playback device according to said priority ranking comprises the steps of:
    identifying a possible succeeding segment having a first highest priority ranking;
    identifying any remaining resources required for presenting said possible succeeding segment having said first highest priority ranking on said playback device that have not been previously loaded into said memory accessible by said playback device;
    loading said any remaining resources required for presenting said possible succeeding segment having said first highest priority ranking into said memory accessible by said playback device.

62. The program storage device claim 60 wherein said resources for said possible succeeding segments are stored on a resource storage device connected to said playback device by a communications means.

63. The program storage device of claim 62 wherein said resource storage device comprises a rotating storage medium.

64. The program storage device of claim 63 wherein said rotating storage medium comprises a rewritable rotating storage medium.

65. The program storage device of claim 63 wherein said rotating storage medium comprises a read-only storage medium.

66. The program storage device of claim 63 wherein said rotating storage medium comprises a CD-ROM.

67. The program storage device of claim 63 wherein said rotating storage medium comprises a DVD disk.

68. The program storage device of claim 62 wherein said resource storage device comprises a fixed storage medium.

69. The program storage device of claim 68 wherein said fixed storage medium comprises random access memory.

70. The program storage device of claim 62 wherein said resource storage device comprises a magnetic tape storage device.

71. The program storage device of claim 62 wherein said communications means comprises a data communications network.

72. The program storage device of claim 62 wherein said communications means comprises a computer bus.

73. The program storage device of claim 61 wherein said step of loading said any remaining resources required for presenting said possible succeeding segment having said first highest priority ranking into said memory accessible by said playback device comprises the step of:
    determining whether said memory accessible by said playback device has sufficient memory space available for loading said remaining resources;
    if said playback device does not have said sufficient memory space available, determining whether any resources for any segments of said multimedia work having a lower priority ranking than said possible succeeding segment having said first highest priority ranking are loaded into said memory;
    if a resource for a segment of said multimedia work having a lower priority ranking than said possible succeeding segment having said first highest priority ranking is loaded into said memory, purging said resource to make room for a portion of said remaining resources.

74. The program storage device of claim 60 wherein said probability factor comprises an estimate of a probability that said each possible succeeding segment will be presented subsequent to said first segment.

75. The program storage device of claim 74 wherein said probability factor comprises an estimate of a probability that said each possible succeeding segment will be presented immediately subsequent to said first segment.

76. The program storage device of claim 74 wherein said probability factor comprises an estimate of a probability that said each possible succeeding segment will be presented within a plurality of segments subsequent to said first segment.

77. The program storage device of claim 60 wherein said cost factor comprises an estimate of a relative time cost required to obtain resources required by said each possible succeeding segment.

78. The program storage device of claim 60 wherein said cost factor comprises an estimate of a relative storage cost required to obtain resources required by said each possible succeeding segment.

79. The program storage device of claim 60 wherein said cost factor comprises an estimate of a relative bandwidth cost required to obtain resources required by said each possible succeeding segment.

80. The program storage device of claim 60 wherein said probability factors are derived from observations of presentation sequences of segments of said multimedia work.

81. The program storage device of claim 60 wherein said probability factors are derived dynamically and updated during execution of said multimedia work.

82. The program storage device of claim 60 wherein said probability factors depend on a characteristic of a user.

83. The program storage device of claim 60 wherein said probability factors depend on an external parameter.

84. The program storage device of claim 60 wherein said step of assigning a priority ranking to said possible succeeding segments of said first segment comprises the steps of:
   identifying a parameter of a user of said playback device;
   assigning said priority ranking based upon said parameter of said user.

85. The program storage device of claim 62 wherein said step of loading resources required by said possible succeeding segments into memory accessible by said playback device according to said priority ranking is controlled by said storage device.

86. The program storage device of claim 60 wherein said resources comprise application program data.

87. The program storage device of claim 60 wherein said resources comprise media data.

88. A program storage device readable by a machine, tangibly embodying a program of instructions executable by the machine to perform method steps for storing resources of a multimedia work on a resource storage device, said method comprising the steps of:
   identifying possible alternative succeeding segments that may be selected for presentation during playback of said multimedia work subsequent to presenting a first segment of said multimedia work;
   assigning a first priority ranking to said possible alternative succeeding segments of said first segment wherein said step of assigning a first priority ranking to possible succeeding segments of said first segment comprises the steps of:
      assigning to each of said possible succeeding segments a probability factor that represents an estimate of the likelihood each of said possible succeeding segments will be selected;
      assigning a cost factor that represents an estimate of the time used to present each of said possible succeeding segments for playback;
      deriving said first priority ranking from said probability factor and said cost factor;
      storing resources required by said possible alternative succeeding segments on said storage device according to said first priority ranking.

89. The program storage device of claim 88 wherein said resource storage device comprises rotating storage medium.

90. The program storage device of claim 89 wherein said rotating storage medium comprises a rewritable rotating storage medium.

91. The program storage device of claim 89 wherein said rotating storage medium comprises a read-only storage medium.

92. The program storage device of claim 89 wherein said rotating storage medium comprises a CD-ROM.

93. The program storage device of claim 89 wherein said rotating storage medium comprises a DVD disk.

94. The program storage device of claim 88 wherein said resource storage device comprises a fixed storage medium.

95. The program storage device of claim 94 wherein said fixed storage medium comprises random access memory.

96. The program storage device of claim 88 wherein said resource storage device comprises a magnetic tape storage device.

97. The program storage device of claim 88 wherein said probability factor comprises an estimate of a probability that said each possible succeeding segment will be presented subsequent to said first segment.

98. The program storage device of claim 88 wherein said probability factor comprises an estimate of a probability that said each possible succeeding segment will be presented immediately subsequent to said first segment.

99. The program storage device of claim 88 wherein said probability factor comprises an estimate of a probability that said each possible succeeding segment will be presented within a plurality of segments subsequent to said first segment.

100. The program storage device of claim 88 wherein said time cost factor comprises an estimate of a relative time cost required to obtain resources required by said each possible succeeding segment.

101. The program storage device of claim 88 wherein said cost factor comprises an estimate of a relative storage cost required to obtain resources required by said each possible succeeding segment.

102. The program storage device of claim 88 wherein said cost factor comprises an estimate of a relative bandwidth cost required to obtain resources required by said each possible succeeding segment.

103. The program storage device of claim 88 wherein said resources comprise application program data.

104. The program storage device of claim 88 wherein said resources comprise media data.

105. The program storage device of claim 88 wherein said method further comprises the steps of:
   identifying possible succeeding segments that may be selected for presenting during playback of said multimedia work subsequent to presenting a second segment of said multimedia work;
   assigning a second priority ranking to said possible succeeding segments of said second segment;
   storing resources required by said possible succeeding segments of said second segment on said resource storage device according to said second priority ranking.

* * * * *